(12) United States Patent
Raksha et al.

(10) Patent No.: US 10,259,254 B2
(45) Date of Patent: Apr. 16, 2019

(54) ARTICLE WITH A DYNAMIC FRAME FORMED WITH ALIGNED PIGMENT FLAKES

(71) Applicant: Viavi Solutions Inc., Milpitas, CA (US)

(72) Inventors: Vladimir P. Raksha, Santa Rosa, CA (US); John Hynes, Monroe Township, NJ (US); Laurence Holden, Cranbury, NJ (US); Paul G. Coombs, Santa Rosa, CA (US)

(73) Assignee: VIAVI SOLUTIONS INC., Milpitas, CA (US)

( * ) Notice: Subject to any disclaimer, the term of this patent is extended or adjusted under 35 U.S.C. 154(b) by 130 days.

(21) Appl. No.: 13/737,836

(22) Filed: Jan. 9, 2013

(65) Prior Publication Data

US 2014/0077485 A1 Mar. 20, 2014

Related U.S. Application Data

(60) Provisional application No. 61/585,954, filed on Jan. 12, 2012.

(51) Int. Cl.
*B42D 25/369* (2014.01)
*C09D 7/61* (2018.01)
(Continued)

(52) U.S. Cl.
CPC ........... *B42D 25/369* (2014.10); *B05D 3/207* (2013.01); *B05D 5/061* (2013.01); *B41M 3/14* (2013.01);
(Continued)

(58) Field of Classification Search
CPC .... B42D 15/00; B42D 15/10; B42D 15/0086; B42D 15/0093; B42D 25/00; B42D 25/22;
(Continued)

(56) References Cited

U.S. PATENT DOCUMENTS 2,570,856 A 10/1951 Pratt ................................. 41/32
3,011,383 A 12/1961 Sylvester et al. ............. 359/584
(Continued)

FOREIGN PATENT DOCUMENTS

AU 488652 11/1977 ................ B44F 1/12
DE 1696245 1/1972 ............... D21H 5/10
(Continued)

OTHER PUBLICATIONS

The Mearl Corporation Brochure for "Mearl Iridescent Film", Peekskill, NY, 1986.
(Continued)

*Primary Examiner* — Justin V Lewis
(74) *Attorney, Agent, or Firm* — Mannava & Kang, P.C.

(57) ABSTRACT

An article includes a substrate and a graphical component forming an image and an optical component which includes magnetic pigment flakes aligned so as to form a frame pattern which surrounds the image. When light is incident upon the pigment flakes from a light source, light reflected from the frame pattern forms a dynamic frame which surrounds the image and appears to move as the substrate is tilted with respect to the light source. The image appears to be stationary when the dynamic frame appears to move.

27 Claims, 22 Drawing Sheets

(51) Int. Cl.
*B42D 25/342* (2014.01)
*B44F 1/10* (2006.01)
*B41M 3/14* (2006.01)
*C09D 11/00* (2014.01)
*B41M 7/00* (2006.01)
*B44F 1/02* (2006.01)
*B05D 3/00* (2006.01)
*B05D 5/06* (2006.01)
*B42D 25/29* (2014.01)
*B42D 25/00* (2014.01)
*C09D 5/29* (2006.01)
*C09D 5/36* (2006.01)
*B42D 25/41* (2014.01)
*B42D 25/378* (2014.01)
*H01F 41/02* (2006.01)

(52) U.S. Cl.
CPC ........... *B41M 7/0072* (2013.01); *B42D 25/00* (2014.10); *B42D 25/29* (2014.10); *B42D 25/342* (2014.10); *B42D 25/378* (2014.10); *B42D 25/41* (2014.10); *B44F 1/02* (2013.01); *B44F 1/10* (2013.01); *C09D 5/29* (2013.01); *C09D 5/36* (2013.01); *C09D 7/61* (2018.01); *C09D 11/00* (2013.01); *H01F 41/0253* (2013.01)

(58) Field of Classification Search
CPC ...... B42D 25/30; B42D 25/328; B42D 25/36; B42D 25/369; B42D 25/373; B42D 2033/16; B42D 2035/20; G09C 3/00
USPC ........ 283/56, 72, 74, 79, 81, 82, 94, 98, 99, 283/109, 901
See application file for complete search history.

(56) References Cited

U.S. PATENT DOCUMENTS

| | | | |
|---|---|---|---|
| 3,123,490 A | 3/1964 | Bolomey et el. | 106/291 |
| 3,338,730 A | 8/1967 | Slade et el. | 428/142 |
| 3,610,721 A | 10/1971 | Abramson et al. | 350/3.5 |
| 3,627,580 A | 12/1971 | Krall | 117/238 |
| 3,633,720 A | 1/1972 | Tyler | 400/105 |
| 3,676,273 A | 7/1972 | Graves | 161/3 |
| 3,790,407 A | 2/1974 | Merton et al. | 428/148 |
| 3,791,864 A | 2/1974 | Steingroever | 117/238 |
| 3,845,499 A | 10/1974 | Ballinger | 346/74.3 |
| 3,853,676 A | 12/1974 | Graves | 161/5 |
| 3,873,975 A | 3/1975 | Miklos et al. | 360/25 |
| 4,011,009 A | 3/1977 | Lama et al. | 359/571 |
| 4,054,992 A | 10/1977 | Fichter | 346/74.3 |
| 4,066,280 A | 1/1978 | LaCapria | 283/91 |
| 4,126,373 A | 11/1978 | Moraw | 359/2 |
| 4,155,627 A | 5/1979 | Gale et al. | 359/568 |
| 4,168,983 A | 9/1979 | Vittands et al. | 106/14.12 |
| 4,197,563 A | 4/1980 | Michaud | 346/74.3 |
| 4,244,998 A | 1/1981 | Smith | 428/195.1 |
| 4,271,782 A | 6/1981 | Bate et al. | 118/623 |
| 4,310,584 A | 1/1982 | Cooper et al. | 428/212 |
| 4,398,798 A | 8/1983 | Krawczak et al. | 359/573 |
| 4,434,010 A | 2/1984 | Ash | 106/415 |
| 4,543,551 A | 9/1985 | Petersen | 335/284 |
| 4,705,300 A | 11/1987 | Berning et al. | 283/91 |
| 4,705,356 A | 11/1987 | Berning et al. | 350/166 |
| 4,721,217 A | 1/1988 | Phillips et al. | 215/230 |
| 4,756,771 A | 7/1988 | Brodalla et al. | 148/244 |
| 4,779,898 A | 10/1988 | Berning et al. | 283/58 |
| 4,788,116 A | 11/1988 | Hochberg | 430/21 |
| 4,838,648 A | 6/1989 | Phillips et al. | 359/585 |
| 4,867,793 A | 9/1989 | Franz et al. | 106/415 |
| 4,923,533 A | 5/1990 | Shigeta et al. | 148/304 |
| 4,930,866 A | 6/1990 | Berning et al. | 359/589 |
| 4,931,309 A | 6/1990 | Komatsu et al. | 427/599 |
| 5,002,312 A | 3/1991 | Phillips et al. | 283/72 |
| 5,009,486 A | 4/1991 | Dobrowolski et al. | 359/580 |
| 5,059,245 A | 10/1991 | Phillips et al. | 106/31.65 |
| 5,079,058 A | 1/1992 | Tomiyama et al. | 428/40 |
| 5,079,085 A | 1/1992 | Hashimoto et al. | 428/327 |
| 5,084,351 A | 1/1992 | Philips et al. | 428/411.1 |
| 5,106,125 A | 4/1992 | Antes | 283/91 |
| 5,128,779 A | 7/1992 | Mallik | 359/2 |
| 5,135,812 A | 8/1992 | Phillips et al. | 428/403 |
| 5,142,383 A | 8/1992 | Mallik | 359/2 |
| 5,171,363 A | 12/1992 | Phillips et al. | 106/31.65 |
| 5,177,344 A | 1/1993 | Pease | 235/449 |
| 5,186,787 A | 2/1993 | Phillips et al. | 216/36 |
| 5,192,611 A | 3/1993 | Tomiyama et al. | 428/354 |
| 5,214,530 A | 5/1993 | Coombs et al. | 359/359 |
| 5,223,360 A | 6/1993 | Prengel et al. | 430/39 |
| 5,254,390 A | 10/1993 | Lu | 428/156 |
| 5,278,590 A | 1/1994 | Phillips et al. | 359/589 |
| 5,279,657 A | 1/1994 | Phillips et al. | 106/31.65 |
| 5,339,737 A | 8/1994 | Lewis et al. | 101/454 |
| 5,364,467 A | 11/1994 | Schmid et al. | 106/404 |
| 5,364,689 A | 11/1994 | Kashiwagi et al. | 428/195 |
| 5,368,898 A | 11/1994 | Akedo | 427/510 |
| 5,411,296 A | 5/1995 | Mallik | 283/86 |
| 5,424,119 A | 6/1995 | Phillips et al. | 428/328 |
| 5,437,931 A | 8/1995 | Tsai et al. | 428/446 |
| 5,447,335 A | 9/1995 | Haslop | 283/91 |
| 5,464,710 A | 11/1995 | Yang | 430/1 |
| 5,474,814 A | 12/1995 | Komatsu et al. | 427/549 |
| 5,549,774 A | 8/1996 | Miekka et al. | 156/209 |
| 5,549,953 A | 8/1996 | Li | 428/64.1 |
| 5,571,624 A | 11/1996 | Phillips et al. | 428/403 |
| 5,591,527 A | 1/1997 | Lu | 428/411.1 |
| 5,613,022 A | 3/1997 | Odhner et al. | 385/37 |
| 5,624,076 A | 4/1997 | Miekka et al. | 241/3 |
| RE35,512 E | 5/1997 | Nowak et al. | 101/454 |
| 5,627,663 A | 5/1997 | Horan et al. | 359/2 |
| 5,629,068 A | 5/1997 | Miekka et al. | 428/148 |
| 5,630,877 A | 5/1997 | Kashiwagi et al. | 118/623 |
| 5,648,165 A | 7/1997 | Phillips et al. | 428/346 |
| 5,650,248 A | 7/1997 | Miekka et al. | 430/1 |
| 5,672,410 A | 9/1997 | Miekka et al. | 428/148 |
| 5,700,550 A | 12/1997 | Uyama et al. | 428/212 |
| 5,742,411 A | 4/1998 | Walters | 359/2 |
| 5,744,223 A | 4/1998 | Abersfelder et al. | 428/206 |
| 5,763,086 A | 6/1998 | Schmid et al. | 428/404 |
| 5,811,775 A | 9/1998 | Lee | 235/457 |
| 5,815,292 A | 9/1998 | Walters | 359/2 |
| 5,856,048 A | 1/1999 | Tahara et al. | 430/1 |
| 5,858,078 A | 1/1999 | Andes et al. | 106/437 |
| 5,907,436 A | 5/1999 | Perry et al. | 359/576 |
| 5,912,767 A | 6/1999 | Lee | 359/567 |
| 5,989,626 A | 11/1999 | Coombs et al. | 427/162 |
| 5,991,078 A | 11/1999 | Yoshitake et al. | 359/567 |
| 6,013,370 A | 1/2000 | Coulter et al. | 28/403 |
| 6,031,457 A | 2/2000 | Bonkowski et al. | 340/572.1 |
| 6,033,782 A | 3/2000 | Hubbard et al. | 428/407 |
| 6,043,936 A | 3/2000 | Large | 359/572 |
| 6,045,230 A | 4/2000 | Dreyer et al. | 359/529 |
| 6,060,143 A | 5/2000 | Tompkin et al. | 428/64.1 |
| 6,068,691 A | 5/2000 | Miekka et al. | 106/403 |
| 6,103,361 A | 8/2000 | Batzar et al. | 428/323 |
| 6,112,388 A | 9/2000 | Kimoto et al. | 29/17.3 |
| 6,114,018 A | 9/2000 | Phillips et al. | 428/200 |
| 6,150,022 A | 11/2000 | Coulter et al. | 428/403 |
| 6,157,489 A | 12/2000 | Bradley, Jr. et al. | 359/584 |
| 6,168,100 B1 | 1/2001 | Kato et al. | 241/1 |
| 6,241,858 B1 | 6/2001 | Phillips et al. | 204/192.15 |
| 6,242,510 B1 | 6/2001 | Killey | 523/204 |
| 6,243,204 B1 | 6/2001 | Bradley, Jr. et al. | 359/585 |
| 6,403,169 B1 | 6/2002 | Hardwick et al. | 427/548 |
| 6,549,131 B1 | 4/2003 | Cote et al. | 340/572.1 |
| 6,586,098 B1 | 7/2003 | Coulter et al. | 428/403 |
| 6,589,331 B2 | 7/2003 | Ostertag et al. | 106/460 |
| 6,643,001 B1 | 11/2003 | Faris | 356/37 |
| 6,649,256 B1 | 11/2003 | Buczek et al. | 428/323 |
| 6,686,027 B1 | 2/2004 | Caporaletti et al. | 428/195.1 |
| 6,692,031 B2 | 2/2004 | McGrew | 283/93 |
| 6,692,830 B2 | 2/2004 | Argoitia et al. | 428/403 |

(56) References Cited

U.S. PATENT DOCUMENTS

| | | | |
|---|---|---|---|
| 6,712,399 B1 | 3/2004 | Drinkwater et al. | 283/111 |
| 6,749,777 B2 | 6/2004 | Argoitia et al. | 252/582 |
| 6,749,936 B2 | 6/2004 | Argoitia et al. | 428/402 |
| 6,751,022 B2 | 6/2004 | Phillips | 359/577 |
| 6,759,097 B2 | 7/2004 | Phillips et al. | 427/510 |
| 6,761,959 B1 | 7/2004 | Bonkowski et al. | 428/156 |
| 6,808,806 B2 | 10/2004 | Phillips et al. | 428/403 |
| 6,815,065 B2 | 11/2004 | Argoitia et al. | 428/403 |
| 6,818,299 B2 | 11/2004 | Phillips et al. | 428/403 |
| 6,838,166 B2 | 1/2005 | Phillips et al. | 428/323 |
| 6,841,238 B2 | 1/2005 | Argoitia et al. | 428/323 |
| 6,902,807 B1 | 6/2005 | Argoitia et al. | 428/403 |
| 6,987,590 B2 | 1/2006 | Phillips et al. | 359/2 |
| 7,029,525 B1 | 4/2006 | Mehta | 106/31.6 |
| 7,047,883 B2 | 5/2006 | Raksha et al. | 101/489 |
| 7,604,855 B2 | 10/2009 | Raksha et al. | 428/195.1 |
| 7,625,632 B2 | 12/2009 | Argoitia | 428/402 |
| 2002/0182383 A1 | 12/2002 | Phillips et al. | 428/199 |
| 2003/0058491 A1 | 3/2003 | Holmes et al. | 359/2 |
| 2003/0087070 A1 | 5/2003 | Souparis | 283/91 |
| 2003/0165637 A1 | 9/2003 | Phillips et al. | 427/598 |
| 2003/0190473 A1 | 10/2003 | Argoitia et al. | 428/403 |
| 2004/0009309 A1 | 1/2004 | Raksha et al. | 427/598 |
| 2004/0051297 A1* | 3/2004 | Raksha | B05D 3/207 283/57 |
| 2004/0081807 A1 | 4/2004 | Bonkowski et al. | 428/195.1 |
| 2004/0094850 A1 | 5/2004 | Bonkowski et al. | 264/1.34 |
| 2004/0100707 A1 | 5/2004 | Kay et al. | 359/883 |
| 2004/0105963 A1 | 6/2004 | Bonkowski et al. | 428/195.1 |
| 2004/0151827 A1 | 8/2004 | Argoitia et al. | 427/7 |
| 2005/0037192 A1 | 2/2005 | Argoitia et al. | 428/323 |
| 2005/0063067 A1 | 3/2005 | Phillips et al. | 359/614 |
| 2005/0106367 A1 | 5/2005 | Raksha et al. | 428/199 |
| 2005/0123755 A1 | 6/2005 | Argoitia et al. | 428/402 |
| 2005/0128543 A1 | 6/2005 | Phillips et al. | 359/15 |
| 2005/0189060 A1 | 9/2005 | Huang et al. | 156/99 |
| 2006/0035080 A1 | 2/2006 | Argoitia | 428/402 |
| 2006/0077496 A1 | 4/2006 | Argoitia | 359/2 |
| 2006/0097515 A1 | 5/2006 | Raksha et al. | 283/91 |
| 2006/0198998 A1 | 9/2006 | Raksha et al. | 428/323 |
| 2006/0202469 A1* | 9/2006 | Teitelbaum | B42D 25/29 283/72 |
| 2006/0263539 A1 | 11/2006 | Argoitia | 427/547 |
| 2007/0058227 A1 | 3/2007 | Raksha et al. | 359/2 |
| 2008/0171144 A1 | 7/2008 | Raksha et al. | 427/162 |
| 2010/0040799 A1 | 2/2010 | Raksha et al. | 427/550 |
| 2011/0121556 A1 | 5/2011 | Raksha et al. | 283/57 |
| 2011/0168088 A1 | 7/2011 | Raksha et al. | 118/600 |

FOREIGN PATENT DOCUMENTS

| | | | |
|---|---|---|---|
| DE | 3932505 | 4/1991 | B44F 1/12 |
| DE | 4212290 | 5/1993 | |
| DE | 4343387 | 6/1995 | B44F 1/12 |
| DE | 19611383 | 9/1997 | B44F 1/12 |
| DE | 19731968 | 1/1999 | B44F 1/12 |
| DE | 19744953 | 4/1999 | B44F 1/12 |
| DE | 19639165 | 10/2003 | C09B 67/02 |
| EP | 0138194 | 10/1984 | B32B 27/08 |
| EP | 0185396 | 12/1985 | D21H 5/10 |
| EP | 0341002 B2 | 11/1989 | G02B 5/28 |
| EP | 0420261 | 4/1991 | G06K 19/00 |
| EP | 0453131 | 10/1991 | |
| EP | 0556449 B1 | 8/1993 | B05D 3/14 |
| EP | 0406667 B1 | 1/1995 | B44C 1/00 |
| EP | 0660262 | 1/1995 | G06K 19/16 |
| EP | 0170439 | 4/1995 | G02B 5/20 |
| EP | 0710508 A1 | 5/1996 | B05D 3/14 |
| EP | 0756945 | 2/1997 | B42D 15/00 |
| EP | 0395410 | 8/1997 | G02B 5/20 |
| EP | 0698256 | 10/1997 | G06K 19/14 |
| EP | 0741370 | 5/1998 | G06K 19/18 |
| EP | 0914261 | 5/1999 | B42D 15/10 |
| EP | 0953937 A1 | 11/1999 | G06K 19/08 |
| EP | 0978373 | 2/2000 | B32B 7/02 |
| EP | 1174278 | 1/2002 | |
| EP | 1239307 | 9/2002 | G02B 5/22 |
| EP | 1353197 | 10/2003 | G02B 5/18 |
| EP | 1498545 A | 1/2005 | D21H 21/42 |
| EP | 1516957 | 3/2005 | D21H 21/42 |
| EP | 1529653 | 5/2005 | B42D 15/00 |
| EP | 1719636 | 11/2006 | B42D 15/10 |
| EP | 1741757 | 1/2007 | C09C 1/00 |
| EP | 2266710 A2 | 12/2010 | B05D 3/14 |
| GB | 1107395 | 3/1968 | G03G 1/00 |
| GB | 1131038 | 10/1968 | B44F 3/00 |
| JP | 63172779 | 7/1988 | C09C 3/04 |
| JP | 11010771 | 1/1999 | B32B 7/02 |
| WO | 1988007214 | 9/1988 | G02B 5/128 |
| WO | 1993023251 | 11/1993 | B41M 3/14 |
| WO | 1995013569 | 5/1995 | G03F 7/00 |
| WO | 1995017475 | 6/1995 | C09C 1/00 |
| WO | 1997019820 | 6/1997 | B42D 15/10 |
| WO | 1998012583 | 3/1998 | G02D 5/28 |
| WO | 2000008596 | 2/2000 | G06K 19/06 |
| WO | 2001003945 | 1/2001 | B42D 15/10 |
| WO | 2002053677 | 1/2001 | B42D 15/10 |
| WO | 2001053113 | 7/2001 | B42D 15/10 |
| WO | 2002000446 | 1/2002 | B42D 15/10 |
| WO | 2002004234 | 1/2002 | B44F 1/10 |
| WO | 2002040599 | 5/2002 | C09C 1/00 |
| WO | 2002040600 | 5/2002 | C09C 1/00 |
| WO | 2002090002 | 11/2002 | B05D 3/14 |
| WO | 2003011980 | 2/2003 | C09C 1/00 |
| WO | 2003102084 | 12/2003 | C09C 1/00 |
| WO | 2004007096 | 1/2004 | B05D 5/06 |
| WO | 2004024836 | 3/2004 | C09D 5/36 |
| WO | 2005000585 | 1/2005 | B41F 15/08 |
| WO | 2005017048 | 2/2005 | C09C 1/00 |
| WO | 2011092502 | 8/2011 | B41M 3/00 |

OTHER PUBLICATIONS

The R.D. Mathis Company Manual for "Thin Film Evaporation Source Reference", Long Beach, CA, Oct. 2001.

A. Argoitia, "Pigments Exhibiting a Combination of Thin Film and Diffractive Light Interference", AIMCAL Fall Technical Conference, 16th International Vacuum Web Coating Conference, Jan. 2002, pp. 1-9.

R. Domnick et al, "Influence of Nanosized Metal Clusters on the Generation of Strong Colors and Controlling of their Properties through Physical Vapor Deposition (PVD)", 49th Annual Technical Conference Proceedings (2006), Society of vacuum Coasters.

A. Argoitia et al, "The concept of printable holograms through the alignment of diffractive pigments", Electronic Imaging Science and Technology Proceedings, SPIE vol. 5310, Jan. 2004.

J.A. Dobrowolski et al, "Research on Thin Film Anticounterfeiting Coatings at the National Research Council of Canada", Applied Optics, vol. 28, No. 14, pp. 2702-2717 (Jul. 15, 1989).

R.L. van Renesse (Ed.), "Optical Document Security", 2$^{nd}$ Ed., Artech House, 254, 349-69 (1997).

Prokes et al (Ed.), Novel Methods of Nanoscale Wire Formation, Mat. Research Soc. Bul., pp. 13-14 (Aug. 1999).

Lotz et al, Optical Layers on Large Area Plastic Films, Precision, Applied Films (Nov. 2001).

A. Argoitia et al, "Pigments Exhibiting Diffractive Effects", Soc. of Vac. Coaters, 45$^{th}$ Annual Tech. Conf. Proceed. (2002).

P. Coombs et al, "Integration of contrasting technologies into advanced optical security devices", SPIE Conference on Document Security, Jan. 2004.

Llewellyn, "Dovids: Functional Beauty—discussion about holography", Paper, Film, and Foil Converter, Aug. 2002.

Hardin "Optical tricks designed to foil counterfeiters" OE Reports, No. 191, Nov. 1999.

Powell et al (Ed), "Vapor Deposition" John Wiley & Sons, p. 132 (1996).

Himpsel et al, "Nanowires by Step Decoration", Mat. Research Soc. Bul., pp. 20-24 (Aug. 1999).

(56) References Cited

OTHER PUBLICATIONS

J.A. Dobrowolski, "Optical Thin-Film Security Devices", Optical Security Document, Rudolf van Renesse, Artech House, 1998, pp. 289-328.
R.L. van Renesse, "Paper Based Document Security—a Review", European Conference on Security and Detection, Apr. 28-30, 1997, Conference Publication No. 437, p. 75-80.
M.T. Gale, "Diffractive Microstructures for Security Applications", Paul Scherrer Institute, Zurich, IEEE Conference Publication London 1991, pp. 205-209, Sep. 16-18, 1991.
Definition of "directly" from Webster's Third New International Dictionary, 1993, p. 641.
J.M. McKierman et al, "Luminescence and Laser Action of Coumarin Dyes Doped in Silicate and Aluminosilicate Glasses Prepared by Sol-Gel Technique", Journal of Inorganic and Organometallic Polymers, vol. 1, No. 1, 1991, pp. 87-103.
J.I. Zink et al, "Optical Probes and Properties of Aluminosilicate Glasses Prepared by The Sol-Gel Method", Polym. Mater. Sci. Eng., pp. 204-208 (1989).
R.W. Phillips et al, "Security Enhancement of Holograms with Interference Coatings", Optical Security and Counterfeit Deterrence Techniques III Proceedings of SPIE vol. 3973, pp. 304-316 (2000).
D.W. Tomkins et al, "Transparent Overlays for Security Printing and Plastic ID Cards", pp. 1-8, Nov. 1997.
J.A. Dobrowolski et al, "Optical Interference Coatings for Inhibiting of Counterfeiting", Optica Acta, 1973, vol. 20, No. 12, 925-037.
Minolta Manual for "Precise Color Communication, Color Control From Feeling to Instrumentation", pp. 18, 20, 22-3, 46-9.
F. Defilet, "Kinegrams 'Optical Variable Devices' (OVD's) for Banknotes, Security Documents and Plastic Cards", LGZ Landis & Gyr Zug Corporation, San Diego, Apr. 1-3, 1987.
S.P. McGrew, "Hologram Counterfeiting: Problems and Solutions", SPIE, vol. 1210 Optical Security and Anticounterfeiting Systems, 1990, pp. 66-76.
R.L. van Renesse, "Security Design of Valuable Documents and Products", SPIE, vol. 2659, Jun. 1996, pp. 10-20.
Steve McGrew, "Countermeasures Against Hologram Counterfeiting", Internet site www.iea.com/nli/publications/countermeasures.htm, Jan. 6, 2000.
R.W. Phillips, "Optically Variable Films, Pigments, and Inks", SPIE vol. 1323 Optical Thin Films III: New Developments, 1990, pp. 98-109.
R.W. Phillips et al, "Optical Coatings for Document Security", Applied Optics, vol. 35, No. 28, Oct. 1, 1996 pp. 5529-5534.
J. Rolfe, "Optically Variable Devices for use on Bank Notes" SPIE, vol. 1210 Optical Security and Anticounterfeiting Systems, pp. 14-19, 1990.
OVD Kinegram Cor "OVD Kinegram Management of Light to Provide Security" Internet site www.kiknegram.com.shome.html, Dec. 17, 1999.
I.M. Boswarva et al., "Roll Coater System for the Production of Optically Variable Devices (OVD's) for Security Applications", Proceedings, $33^{rd}$ Annual technical Conference, Society of Vacuum Coaters, pp. 103-109 (1990).
Halliday et al, "Fundamental of Physics, Sixth Edition", p. 662, Jul. 2000.
PCT Search Report for corresponding PCT application No. PCT/US2013/020873.
PCT Search Report for corresponding PCT application No. PCT/US2013/020885.
Search report from corresponding EP application No. EP13735802.
Search report from related EP application No. EP13736068.

\* cited by examiner 610  620

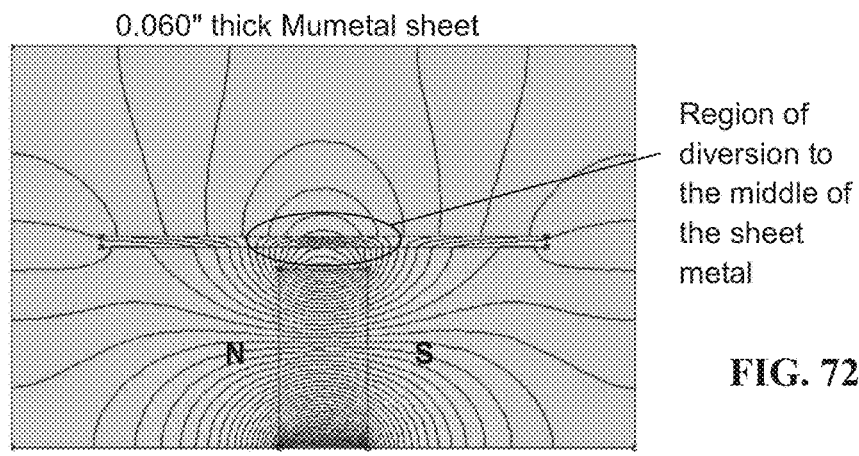
FIG. 72
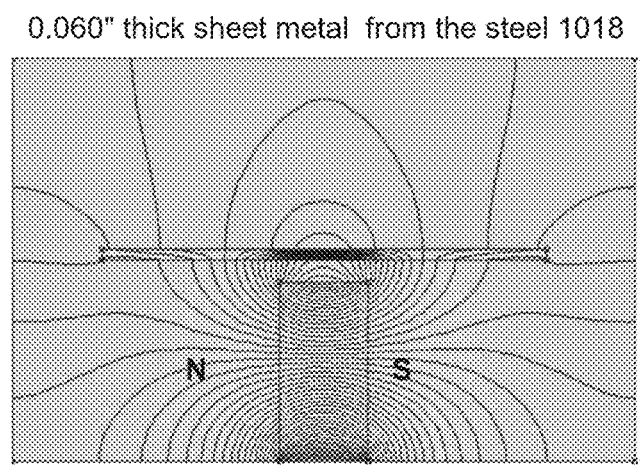
FIG. 73
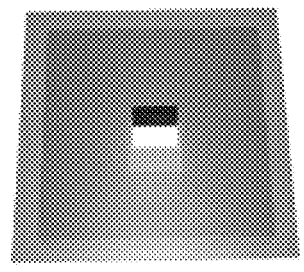 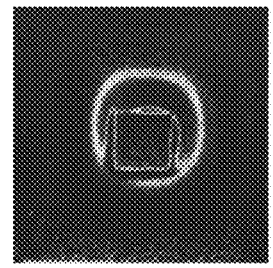
FIG. 74      FIG. 75

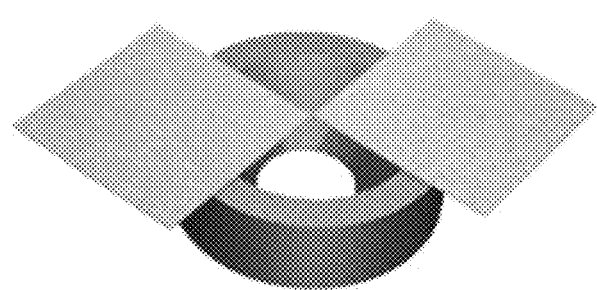
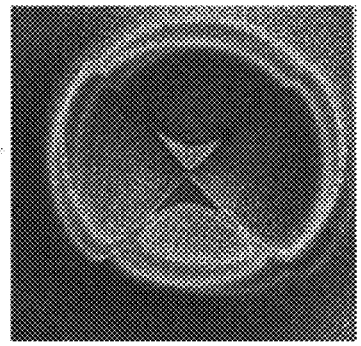
FIG. 76  FIG. 77
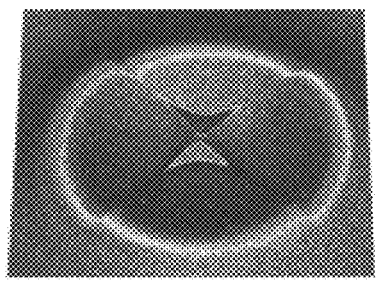
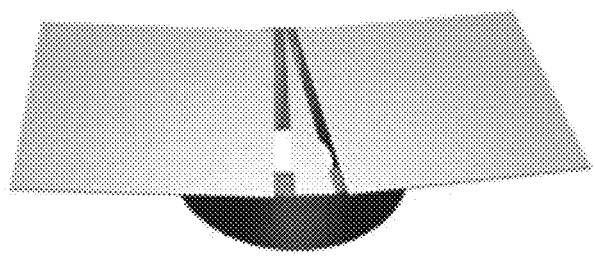
FIG. 78  FIG. 79
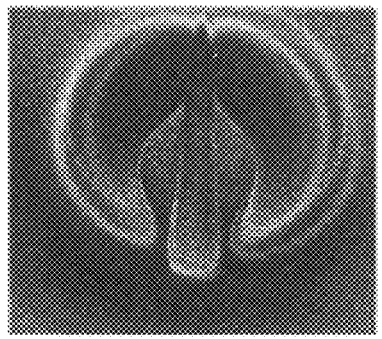
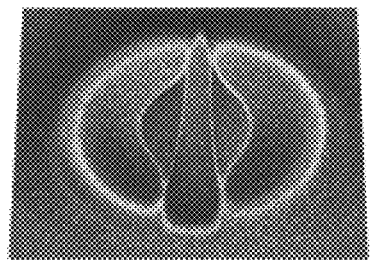
FIG. 80  FIG. 81

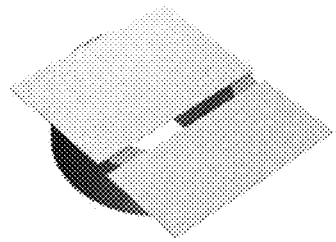
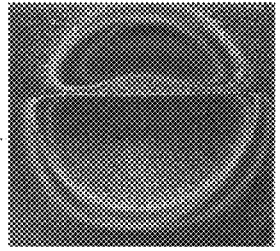
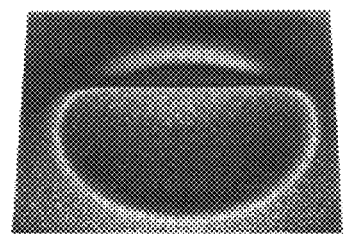
FIG. 82    FIG. 83    FIG. 84
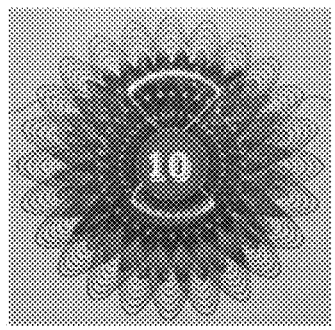
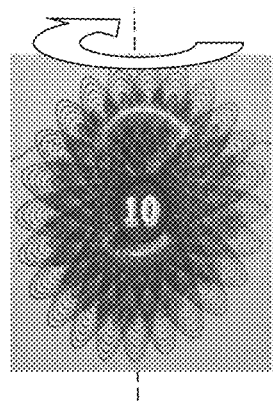
FIG. 85    FIG. 86
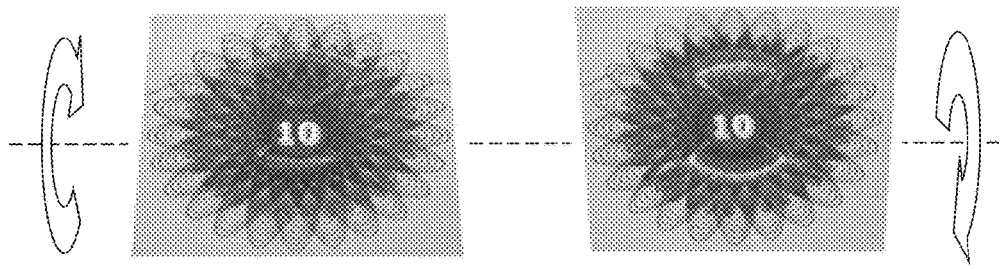
FIG. 87    FIG. 88

ARTICLE WITH A DYNAMIC FRAME FORMED WITH ALIGNED PIGMENT FLAKES

CROSS-REFERENCE TO RELATED APPLICATIONS

The present invention claims priority from U.S. Provisional Patent Application No. 61/585,954 filed Jan. 12, 2012, incorporated herein by reference.

TECHNICAL FIELD

The present invention relates generally to optically variable devices and, more particularly, to aligning or orienting magnetic flakes in a painting or printing process in order to obtain an illusive optical effect.

BACKGROUND OF THE INVENTION

Optically variable devices are used in a wide variety of applications, both decorative and utilitarian; for example, such devices are used as security devices on commercial products. Optically variable devices can be made in numerous ways to achieve a variety of effects. Examples of optically variable devices include the holograms imprinted on credit cards and authentic software documentation, color-shifting images printed on banknotes and enhancing the surface appearance of items such as motorcycle helmets and wheel covers.

Optically variable devices can be made as a film or foil that is pressed, stamped, glued, or otherwise attached to an object, and can also be made using optically variable pigments. One type of optically variable pigments is commonly called color-shifting pigments because the apparent color of images appropriately printed with such pigments changes with the change of the angle of view and/or illumination. A common example is the numeral "20" printed with color-shifting pigments in the lower right-hand corner of a U.S. twenty-dollar bill, which serves as an anti-counterfeiting device.

Optically variable devices can also be made with magnetic pigments that are aligned with a magnetic field. After coating a product with a liquid composition, a magnet with a magnetic field having a desirable configuration is placed on the underside of the substrate. Magnetically alignable flakes dispersed in a liquid organic medium orient themselves parallel to the magnetic field lines, tilting from the original orientation. This tilt varies from normal to the surface of a substrate to the original orientation, which included flakes essentially parallel to the surface of the product. The planar oriented flakes reflect incident light back to the viewer, while the reoriented flakes do not.

Some anti-counterfeiting devices are covert, while others are intended to be noticed. Unfortunately, some optically variable devices that are intended to be noticed are not widely known because the optically variable aspect of the device is not sufficiently dramatic. For example, the color shift of an image printed with color-shifting pigments might not be noticed under uniform fluorescent ceiling lights, but is more noticeable in direct sunlight or under single-point illumination. This can make it easier for a counterfeiter to pass counterfeit notes without the optically variable feature because the recipient might not be aware of the optically variable feature, or because the counterfeit note might look substantially similar to the authentic note under certain conditions.

In order to make optical security devices highly noticeable, relatively high concentrations of magnetic flakes are used for forming bright images which e.g. appear to be three-dimensional images. The resulting optical devices do not transmit light. Sometimes they are referred to as security patches, and there is a security risk associated with possible transfer of a patch to a forged document. Additionally, the opaque security devices formed of magnetic pigments may be undesirable because they essentially hide the background pattern whereas intrinsic Guilloché patterns are widely relied upon in banknote printing.

Accordingly, there is a need to mitigate the disadvantages of existing security patches. It is an object of the present invention to provide highly noticeable security devices where optical effects produced by magnetically aligned pigments cooperate with the underlying printed patterns, and which may be formed within high speed printing processes.

SUMMARY OF THE INVENTION

An article includes a substrate and a graphical component supported by the substrate and forming an image and a background discernible from one another; the graphical component includes a first coating printed with a first ink having a plurality of first pigments in a first binder, e.g. printed on the substrate with conventional ink(s); the first pigments may be dye particles. The article also has an optical component supported by the substrate, possibly printed in close proximity or over of the graphical component; the optical component includes a second coating of a second ink which has a plurality of second pigments in a second binder. The second pigments are pigment flakes each including a magnetic or magnetizable material, aligned so as to form a frame pattern such that the frame pattern preferably surrounds at least a part of the image. Within the frame pattern, along a plurality of radial directions originating at the image, angles which the pigment flakes form with the substrate decrease until a portion of the pigment flakes are parallel to the substrate and then the angles along those directions increase so that, when light is incident upon the pigment flakes from a light source, light reflected from the frame pattern forms a dynamic frame which surrounds the image and appears to move as the substrate is tilted with respect to the light source. The image appears to be stationary, and the size and concentration of the pigment flakes in the second ink is such that a portion of the background adjacent to the dynamic frame is visible through the optical component which creates the illusion of floating, i.e. the image and/or dynamic frame may be perceived as floating above or below of the substrate, when the article is tilted and the dynamic frame appears to move. The concentration of the pigment flakes in the second ink may be less than 14 wt %, and preferably between 4 and 10 wt % of the cured, dried ink. The second ink is different from the first ink, i.e. second pigments are different from the first pigments, or the concentration of the first pigments in the first ink is different from a concentration of the first pigments in the first ink. The article may be used as a security device, e.g. a banknote.

In one aspect of the invention, an article has a substrate and a graphical component which includes a first coating made with a first ink; the first coating forms a central image. The article also has an optical component which includes a second coating made with a second ink different from the first ink, and contains pigment flakes in a concentration of less than 14 wt %. The graphical and optical components are supported by the substrate, and the magnetically alignable flakes are aligned so as to form a frame pattern surrounding the image. Within the frame pattern, angles which flakes form with the substrate decrease to practically zero and then increase along a majority of radial directions originating at the image so that, when light is incident upon the magnetically alignable flakes from a light source, light reflected from the frame pattern forms a dynamic frame surrounding the image, wherein the first bright frame appears to move as the substrate is tilted with respect to the light source, and the central image appears to be stationary when the dynamic frame appears to move. The second coating may be printed over the first coating, or the first coating may be printed over the second coating so that the bright dynamic frame is only partially visible through gaps in the first coating. The optical component may be formed on a transparent plastic support and attached to the substrate supporting the graphical component. The pigment flakes contain a permanent magnetic or magnetizable material, and are dispersed in the ink in a concentration preferably in the range of 4-10 wt %.

In yet another aspect of the invention, an article includes a substrate and an optical component, e.g. a coating, including pigment flakes in a binder supported by the substrate. The optical component has a first curved region with a first plurality of pigment flakes aligned in a first arching pattern in cross sections of the first curved region so that light reflected from the first plurality of pigment flakes provides an image of a first frame. The optical component has a second curved region with a second plurality of pigment flakes different from the first plurality of pigment flakes, aligned in a second arching pattern in cross sections of the second curved region so that light reflected from the second plurality of pigment flakes provides an image of a second frame, wherein the first frame appears to move relative to the second frame when the substrate is tilted. The pigment flakes include a magnetic or magnetizable material for magnetic alignment of the flakes. Preferably, the first and second arching patterns are maintained along the first and second curved regions, respectively. The first and second curved regions may be different regions, or may coincide. The pigment flakes contain a permanent magnetic or magnetizable material, and are dispersed in the ink in a concentration preferably in the range of 4-8 wt %. The article may be used as a security device, e.g. a banknote.

In another aspect of the invention, the pigment flakes forming the optical component are aligned within the binder using a magnetic assembly which includes one magnet or a plurality of magnets stacked one on the top of another. The magnet or stack of magnets has North and South poles on the top and bottom surfaces thereof, and a tapered extruded cut (through funnel) or a countersink cut between the top and bottom surfaces. The top and bottom openings of the cut may have a variety of shapes including circle, oval, square, hexagon, and other shapes, wherein the top and bottom openings of the cut are different in size, although, preferably, have similar shapes. For aligning the pigment flakes, the larger opening is preferably proximate to the substrate supporting the magnetically alignable pigment flakes, whereas the smaller opening is distal from the substrate. The magnetic assembly may include a diverter with an opening smaller than the top opening of the magnet or stack of magnets. Pigment flakes aligned with a magnet having a through countersink cut, when irradiated with light from a light source, reflect light so as to form a dynamic frame which changes its size when the frame appears to move thus exhibiting a dynamic morphing optical effect which may be employed in the absence of the graphical component.

According to another aspect of the invention, the optical component includes a binder with magnetically alignable pigment flakes dispersed therein; the pigment flakes are aligned using a magnetic field such that along the majority of radial directions, the minimal angles that the field lines form with the substrate decrease from 70 degrees to zero and then increase to 70 degrees, more preferably the angles change from 80° to zero and then again to 80°. Consequently, it is preferable that along at least one of the plurality of radial directions, angles that the magnetically alignable flakes form with the substrate decrease from 70 degrees to practically zero and then increase to 70 degrees; more preferably from 80° to practically zero and then again to 80°.

In yet another aspect of the invention, an article includes a substrate, a first coating of a solidified binder, e.g. first ink or paint, supported by the substrate, and a second coating of a solidified binder, e.g. second ink or paint including pigment flakes, supported by the substrate. The first and second coatings form an image including an indicia, a background, and a frame region at least partially surrounding the indicia and covering a portion of the background pattern. A cross-section of the frame region has an arching pattern of aligned pigment flakes, and the arching pattern is maintained along the frame region so that, when irradiated by light from a light source, light reflected from the arching pattern forms a bright frame which at least partially surrounds the indicia, and moves relative to the background when the substrate is tilted relative to the light source. The concentration of the pigment flakes in the second ink is less than 14% by weight so that a portion of the background underlying the frame region outside of the bright frame is at least partially visible whereby the bright dynamic frame delimits an indicia-containing dynamic region from the background, and the dynamic region moves relative to the background when the substrate is tilted so that the dynamic frame or indicia appears floating above or below the substrate. The indicia may include a symbol, a logo, or an image. The background may include a pattern so that the bright dynamic frame obscures different elements of the background pattern as the bright frame appears to move.

According to another aspect of the invention, an article includes a substrate and a multilayered image supported by the substrate, wherein the multilayered image includes an indicia, a background pattern, and a coating including pigment flakes each having a magnetic or magnetizable material. The coating is supported by a frame region of the substrate, surrounding the indicia and covering a portion of the background pattern. A cross-section of the coating in the frame region has an arching pattern of pigment flakes, and the arching pattern is maintained along the frame region so that light reflected from the arching pattern forms a dynamic frame which surrounds the indicia and moves relative to the background when the substrate is tilted. The size and concentration of the pigment flakes in the second ink is such that a portion of the background adjacent to the dynamic frame is at least partially visible, whereby the dynamic frame delimits an indicia-containing dynamic region from the background, and the dynamic region moves relative to the background when the substrate is tilted so that the dynamic frame or indicia appears floating out of the plane of the substrate. The concentration of the pigment flakes in the coating may be less than 14% by weight of the dry ink.

According to another aspect of the invention provides a method of authentication of a document or object having a frame formed by magnetically alignable flakes. In regular light conditions, the object is irradiated with light of a different color from an additional light source, possibly a flashlight. Under the regular light conditions, the object exhibits one or more bright frames, and when irradiated with the light of different color from the additional light source—the object exhibits an additional frame of the color of the light from the additional light source.

A method of manufacturing an article for providing a morphing effect includes proving a coating having pigment flakes dispersed in a binder to a substrate, wherein the pigment flakes include a magnetic or magnetizable material, aligning the pigment flakes with a magnetic assembly including a magnet and a diverter, and fixing the binder. The magnet has top and bottom surfaces, and a through cut between the top and bottom surfaces whereby the top surface has a top opening and the bottom surface has a bottom opening. The magnetic axis of the magnetic assembly is in a direction from one to another of the top and bottom surfaces. The diverter is adjacent to the top surface of the magnet, wherein the top opening is only partially covered by the diverter.

In another aspect of the invention, an article includes a substrate, a graphical component including a plurality of first pigments in a first ink supported by the substrate and forming an image, and an optical component including a plurality of second pigments in a second ink supported by the substrate. A concentration of the second pigments in the second ink is less than 14 wt %, and the second pigments are pigment flakes each including a magnetic or magnetizable material, aligned so as to form a frame pattern such that the frame pattern surrounds the image and, within the frame pattern, angles which pigment flakes form with the substrate decrease to zero and then increase along a plurality of radial directions originating at the image so that, when light is incident upon the pigment flakes from a light source, light reflected from the frame pattern forms a dynamic frame which surrounds the image and appears to move as the substrate is tilted with respect to the light source, and wherein the image appears to be stationary when the dynamic frame appears to move.

BRIEF DESCRIPTION OF THE DRAWINGS

The invention will be described in greater detail with reference to the accompanying drawings which represent preferred embodiments thereof, wherein:

FIG. 72 is a schematic diagram of a magnetic field;

FIG. 73 is a schematic diagram of a magnetic field;

FIG. 74 is a schematic diagram of a magnetic assembly;

FIG. 75 is a photograph of a printed article;

FIG. 76 is a schematic diagram of a magnetic assembly;

FIGS. 77 and 78 are photographs of a printed article;

FIG. 79 is a schematic diagram of a magnetic assembly;

FIGS. 80 and 81 are photographs of a printed article;

FIG. 82 is a schematic diagram of a magnetic assembly;

FIGS. 83 and 84 are photographs of a printed article; and,

FIGS. 85 through 88 are photographs of a printed article.

DETAILED DESCRIPTION

Figure 1:
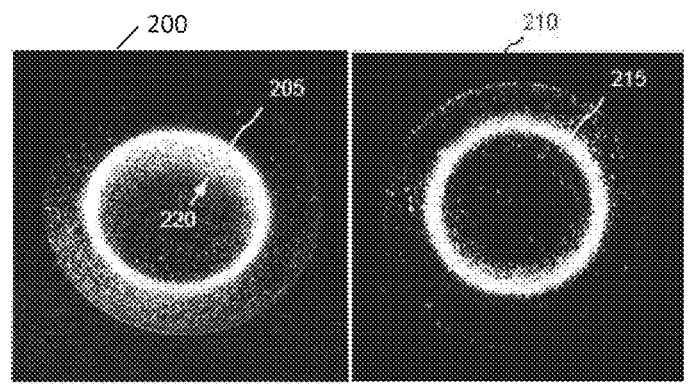
FIG. 1 is photographs of ring-shaped frames printed with magnetic inks having different concentrations of magnetically alignable flakes.

A previously unknown effect has been discovered by the inventors in their experiments with optically variable frames surrounding symbols printed in regular ink: a bright frame formed by light reflected from magnetically aligned pigment flakes appears to float parallel to the substrate whereon the magnetic ink is printed. Unexpectedly, the bright frame appears to move above or below the surface of the substrate.

The purpose of the experiments was to combine optical effects generated by magnetically aligned flakes with conventional printed graphical images; the inventors were using optically variable images as frames surrounding printed images. The optically variable frames simultaneously serve as security features per se, because they are difficult to reproduce, as decorative elements for their spectacular optical effects, as well as for attracting a human eye to the image surrounded by the frame, the way guilloche patterns highlight denomination numerals on banknotes.

Conventionally, optically variable images are printed with inks having around 20-30 wt % concentration of magnetically aligned flakes in a clear binder. Even higher concentrations have been considered in order to improve the visibility of a relatively narrow frame which surrounds an image. However, the inventors unexpectedly found advantages in using a diluted magnetic ink.

It has been found that, counter intuitively, dynamic frames printed with a diluted ink have better defined shapes and are more distinct from the background than frames printed with high-concentration inks. Apparently, a diluted magnetic ink allows removal of unwanted effects and shadows. In particular, the background overprinted with a low-concentration magnetic ink is distinctly visible through the magnetic ink practically everywhere, with the exception of a region where the magnetically alignable flakes are aligned in a predetermined manner so as to focus reflected light to form a bright image.

For focusing, or concentrating, the reflected light, the magnetic reflective flakes are aligned in a frame pattern which may be characterized by the pattern's cross-section between the inner and outer imaginary contours of the frame. The frame pattern may surround an image, e.g. a numeral or logo printed with regular non-magnetic ink, the way a wooden frame surrounds a painting. The cross-section of the frame pattern formed of the aligned pigment flakes then corresponds to the cross-section of a wooden plank of the painting's frame. In the cross-section of the frame pattern formed of the pigment flakes, in the central part of the cross-section, a portion of the pigment flakes are aligned parallel to the substrate. The cross-section of the frame pattern also includes pigment flakes tilted so that the angles which the pigments flakes form with the substrate gradually increase on both sides of the central part of the cross-section. In other words, when the frame pattern is dissected along a radial direction originating at the image surrounded by the frame, in the cross-section of the frame pattern, angles which flakes form with the substrate decrease from at least 70 degrees and preferably from 80 degrees to practically zero (the flakes are essentially parallel to the substrate) in the central part of the cross-section, and then again increase to at least 70 degrees and preferably to 80 degrees. The pigment flakes within the frame pattern may be thought of as forming a Fresnel reflector which to some degree focuses, or concentrates, reflected light into a bright image visible to an observer. It turned out that the diluted inks with the concentrations as low as 4 wt % provide adequately noticeable images formed by light reflected from the frame patterns of aligned reflective flakes.

On other portions of the substrate, absent of a light-focusing pattern, the magnetic ink is practically invisible because of the low concentration of the ink. FIG. 1 presents photographs of ring-shaped frames printed on a black background with a magnetic ink and aligned using the same magnetic field configuration. The difference between the two images is that the left image 200 is printed with an ink having 25 wt % of magnetically alignable flakes, whereas the right image 210 is printed with an ink having 7.5 wt % of magnetically alignable flakes; the weight percentage relates to in cured, dried inks. Both images show bright rings 205 and 215, respectively. In addition, the left image 200 having a higher concentration of magnetic flakes shows a shadow 220 which is practically absent in the right image 210. Although the right ring 215 may appear less bright than the left ring 205, the right ring 215 is better delimited from the background and thus is more legible. Accordingly, the decrease of ink concentration unexpectedly improves the illusive image formed by focusing reflected light.

Figure 2:
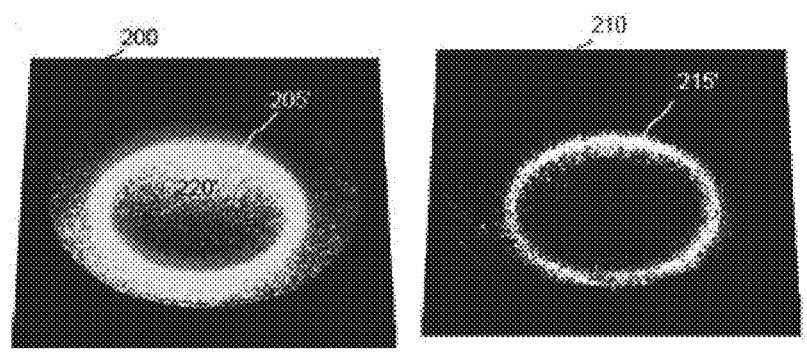
FIG. 2 is photographs of the frames shown in FIG. 1, at a different angle of observation.

It can be appreciated that, when the substrate 210 is tilted, or a light source moves relative to the substrate, a different group of flakes reflect light into the eye of an observer, whereby the bright image appears to move. FIG. 2 shows the same printed images 200 and 210 tilted with their upper edge away from the observer; the bright rings 205 and 215 have moved into the positions 205' and 215', and the shade 200 has become an even more noticeable shade 220'. In other words, the illusive movement of the right ring 215 is easier to recognize than the movement of the left ring 205, because the left ring 205 leaves a wide trace of shadows 220 and 220' when the ring moves.

Another previously unnoticeable effect became apparent with the use of the low-concentration ink: the focus of reflected light appears to be out of the plane of the coating made of the magnetic ink. Consequently, the entire right ring 215 may appear to float above or below the surface of the substrate. It is our understanding that the left ring 205 printed with a high-concentration ink lacks the floating effect because the exact position of the bright ring 205 is obfuscated by the shadows 220.

For providing the floating effect, the size and concentration of the pigment flakes in the magnetic ink should be chosen so as to make a portion of the background overprinted with a low-concentration magnetic ink and adjacent to the moving ring visible through the magnetic ink. This delimits the ring from the background, making the ring appear as a separate illusive element, so that the shape and position of the ring are defined by the curved alignment of the flakes. It may be thought that the visibility of the background near the ring separates the ring from the substrate, whereas the alignment of the flakes concentrating the reflected light enables a distance between the ring and the substrate, and the visible background serves as a frame of reference for the movements of the ring. Thus the visibility of the background and the alignment of the flakes synergistically provide the floating effect.

Based on the aforedescribed observations, it has been suggested to make printed articles with dynamic stereoscopic effects.

With reference to FIGS. 4-9, an article, which may be used as an optical security article, includes a substrate 301, and a first coating supported by the substrate 301. The first coating forms a graphical component including a central image 304 and possibly a background pattern such as rosettes 302 and 303; the image 304 is clearly discernible from the background rosettes 302 and 303. The first coating has first pigments in a first binder, and may be printed with a first ink which in this case is a regular, conventionally-tinted ink. The article further includes a second coating also referred to as an optical component 305, also supported by the substrate 301.

The second coating is made with a plurality of second pigments in a second binder which form a second ink which is different from the first ink. The second coating is shown as an opaque coating in FIG. 5, as it was immediately after printing when magnetic ink has not been exposed to the magnetic field yet. The second pigments are pigment flakes each including a magnetic or magnetizable material so as to make the flakes magnetically alignable in a liquid binder.

Figure 3:
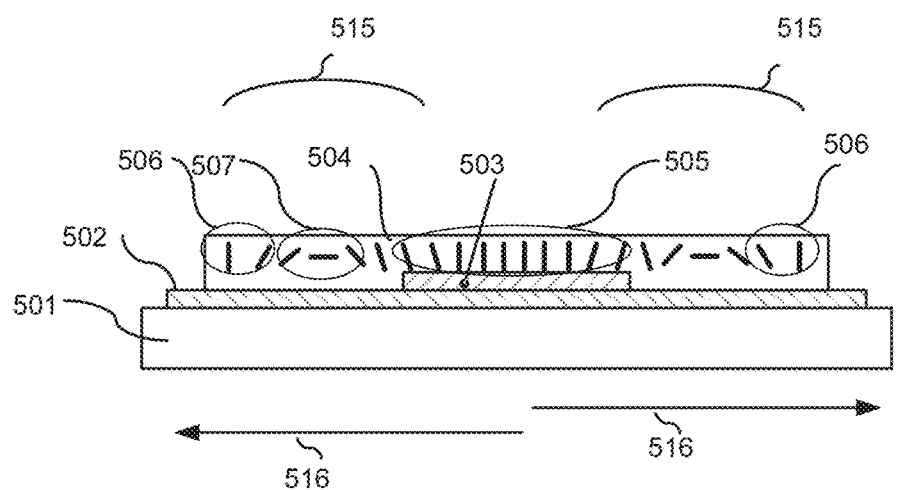
FIG. 3 is a schematic cross-section of an ink or paint coating.
Figure 4:
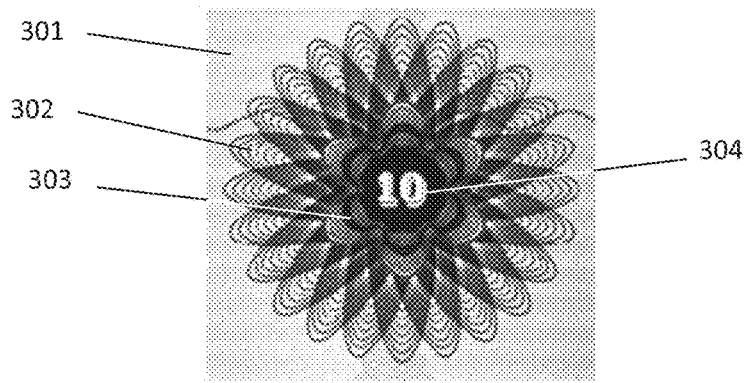
FIGS. 4 and 5 are photographs of an article.

In the second coating, in the solidified second binder, the pigment flakes are aligned so as to form, within the second coating 305, a frame pattern surrounding the image. In a cross-section of the coating shown in FIG. 3, which will be discussed in more detail later, the frame pattern of flake alignment is represented by two regions 515. Within the frame pattern, angles which flakes form with the substrate decrease to practically zero (the flakes are parallel to the substrate) and then increase along a plurality of radial directions originating at the image, such as directions 516 shown in FIG. 3. When light is incident upon the pigment flakes from a light source, light reflected from the frame pattern forms a bright dynamic frame 306 surrounding the image 304. Pigment flakes in the rest of the second coating 305 are not visible because they have been aligned by the applied field at steep angles to the substrate that makes the coating 305 transparent and useful for viewing of the rosettes 302 and 303. For the purpose of this application, the term "surrounding" is understood as "at least partially surrounding" and possibly having gaps or openings if printed in patterns. The bright dynamic frame 306 in FIG. 7 appears to move as the substrate is tilted with respect to the light source, and the image 304 of the numeral "10" appears to be stationary when the bright frame appears 306 to move. The "bright frame" is a dynamic frame formed by light reflected from the aligned pigment flakes, the dynamic frame is noticeable because it is brighter than the background and, preferably, brighter than the central image. The dynamic frame 306 may be perceived as floating below or above the substrate 301, which depends on the spatial imagination of the observer and the convex or concave alignment of the flakes in the frame pattern 615 (FIG. 3). In general, an observer may perceive an image formed by a concave reflector as moving toward the observer when the article is tilted with its upper edge away from the observer, and may perceive an image formed by a convex reflector as moving away from the observer when the article is tilted with its upper edge away from the observer. The pigment flakes within the frame pattern may be thought of as forming a convex Fresnel reflector which creates a virtual image of the light source behind the surface of the substrate. In this case, an observer may see the image of the light source in the form of the bright dynamic frame 306 which moves underneath the central image 304 creating the illusion of some space therebetween, and the central image 304 may be perceived as positioned above the bright frame 306.

For providing the floating effect, the concentration of the pigment flakes in the second ink should be chosen so as to make a portion of the background overprinted with a low-concentration magnetic ink and adjacent to the moving ring visible through the magnetic ink, or at least partially visible so that the background pattern is discernible with an unaided human eye. Accordingly, the concentration and size of the flakes should be chosen such as to provide the at least partial visibility of the background. In other words, a suitable concentration of the pigment flakes in the ink, which is defined by the weight of the flakes in dry, cured ink, depends on the size and density of the flakes. A person skilled in the art, given particular magnetic flakes, would easily find a suitable ink concentration which provides the visibility of the background. In general, the second ink may have a concentration of the pigment flakes of less than 14 wt %, preferably in the range between 4 and 14 wt %, and more preferably between 5 and 12 wt %.

The central image 304 and the background pattern 302 and 303 may be printed in one or more colors, i.e. using one or more inks. A variety of background patterns may be employed in place of the rosettes 302 and 303, and a variety of images may be used in place of the numeral 304.

The second coating 305 may be printed onto the substrate 301 over the first coating which provides the graphical component including printed elements 302-304. Alternatively, the graphical component may be printed over the optical component so that the bright frame is visible through gaps in the graphical component as discussed further with reference to FIGS. 13 and 14.

Figure 37:
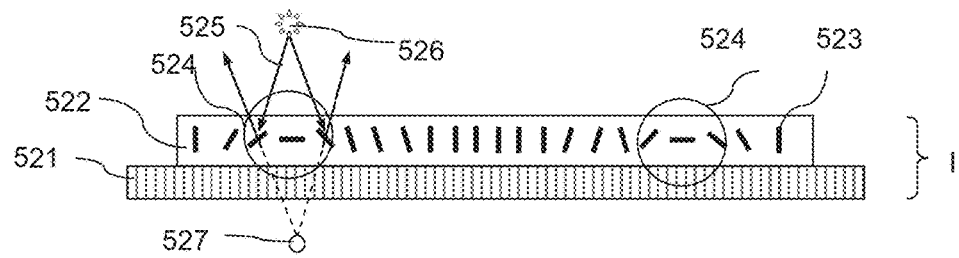
FIG. 37 is a schematic diagram of an article.
Figure 38:
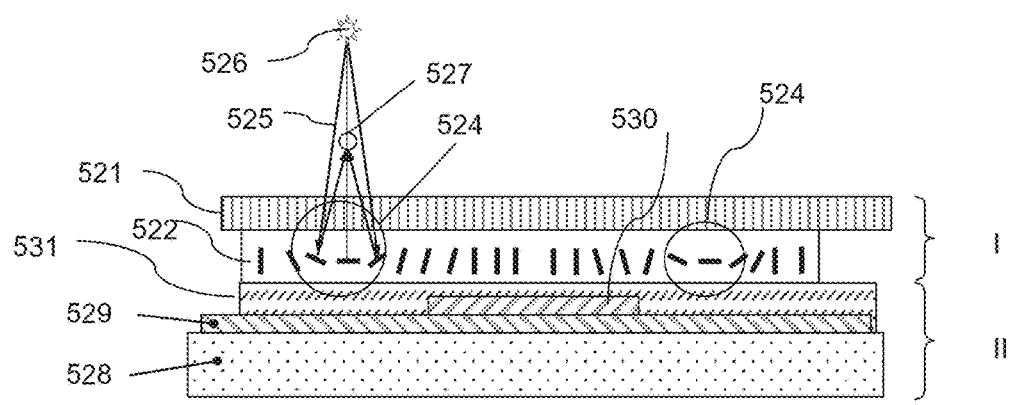
FIG. 38 is a schematic diagram of an article.

The optical component 305 (FIG. 5) formed of the magnetic ink may be printed onto a thin transparent plastic support sheet as illustrated in FIGS. 37 and 38. After aligning the magnetic pigment particles in an external magnetic field, the transparent polymer-based support sheet is attached to the substrate 301 over the graphical component. The support sheet may be adhesively laminated to the substrate 301, e.g. with a printed side of the sheet adjacent to graphical component on the substrate 301.

Figure 5:
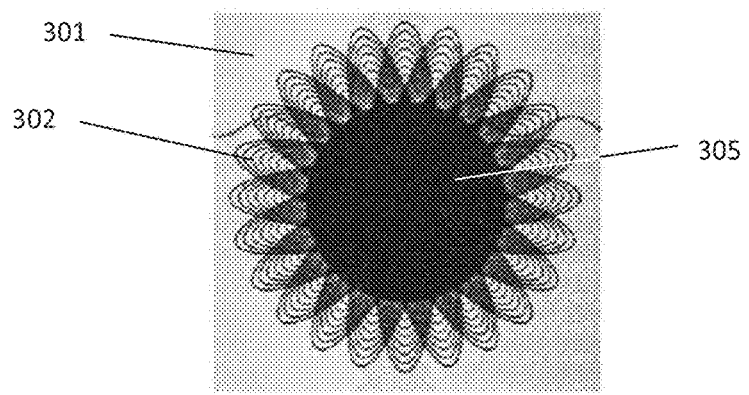

In a particular example, the substrate 301 (FIG. 4), possibly a fragment of a banknote, has a large Guilloche rosette 302, a small six-pointed Guilloche rosette 303, and a numeral 304 printed on the surface of the note with a conventional technique. Magnetic ink, containing Gold-to-Green color-shifting magnetically alignable pigment flakes dispersed in clear UV-curable ink binder, was printed on the note in the shape of a circle 305 as shown in FIG. 5. The concentration of the pigment flakes in the dry, cured ink was 5 wt %. The circle was opaque immediately after the printing procedure as shown in FIG. 5, but became transparent in most areas after aligning the flakes at steep angles to the substrate with the applied magnetic field, and solidifying the binder. In this embodiment, the second coating 305 covers the image 304, however, due to the low concentration of the second ink and the normal or near-normal orientation of the flakes the image 304 may be visible through the second coating; preferably, the flakes in the second coating above the image 304 are oriented normally to the substrate. Alternatively, the second coating 305 may have an aperture above the image 304.

Figure 6:
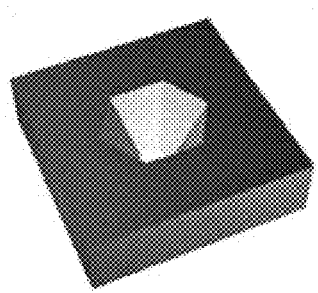
FIG. 6 is a schematic diagram of a magnet.

The substrate 301 with the wet ink was placed on the top of a hexagonal magnet with a tapered extruded cut (a through funnel cut) as illustrated in FIG. 6. The magnet had a hexagonal funnel-like cavity (a through cut) in its center. The center of the magnetic print was registered with the magnet so that their centers coincided. The ink was cured with UV light after magnetic platelets completed their alignment in the field of the magnet forming an enclosed convex hexagonal rolling effect. The hexagon 306 (FIG. 7) surrounds the numeral 304 close to periphery of the small Guilloche rosette 303. The six-pointed shape of the rosette 303 was specifically designed to match the size and the shape of the magnetically formed hexagon 306.

Figure 7:
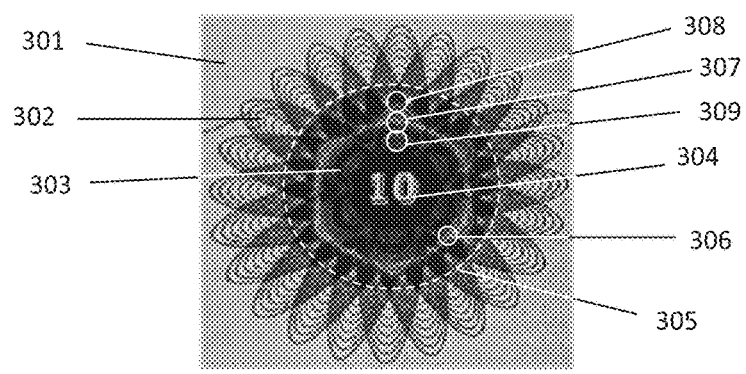
FIGS. 7-9 are photographs of an article.

After the curing, the ink has completely changed its appearance. FIG. 7 shows the resulting article at the normal angle of observation. A bright, narrow-lined gold hexagon 306 has been formed by light reflected from the layer of magnetically oriented ink 305 above the cut of the magnet shown in FIG. 5. All other regions of the magnetic ink 305 became transparent allowing observations of the Guilloche rosettes 302 and 303 in fine detail. At the normal angle of observation, the hexagon 306 may be seen as it were located underneath the surface of the print below the dark green circle with the numeral. At this angle, a corner of the bright hexagon 306 appears to be in a position marked by a circle 307, so that the hexagon obscures a portion of the rosette there. Nearest regions of the graphical image, marked by circles 308 and 309, are not obscured and are clearly visible.

Figure 8:
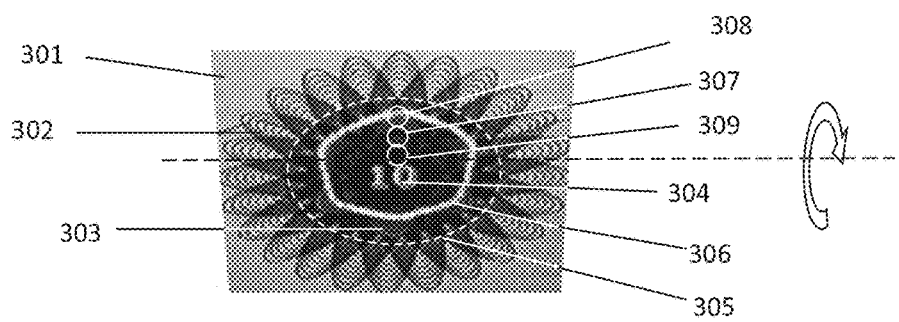

If the sample is tilted with its upper edge toward an observer, as shown in FIG. 8, the observer may see the bright hexagon 306 moving in the direction opposite to the tilt. The corner of the hexagon 306 approaches the edge of the magnetic print 305 and obscures the place 308 leaving the place 307, where the bright frame 306 was at the normal angle, unobscured. There is no shadow effects in the printed security feature. An observer may perceive the hexagon 306 as floating out of the plane of the rosette 303 because the hexagon obscures different portions of the rosette 303. The image 304, especially if it is of a light or bright color, may be perceived as being closer to the observer and thus floating with or above the hexagon.

Figure 9:
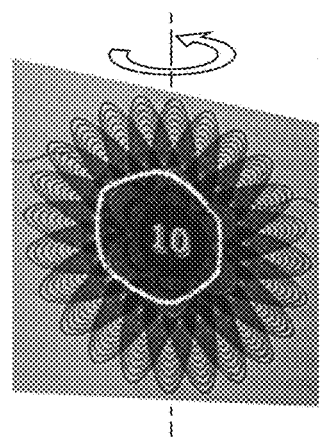

When the printed article is tilted to the left or to the right, the hexagon moves in the direction opposite of the tilt. FIG. 9 demonstrates the tilt of the printed image to the right.

Advantageously, the thin bright frame 306 obscures only a small portion of the printed image. An observer initially focuses on familiar and recognizable features—the numeral 304. However, the magnetically aligned feature is bright and dynamic because it moves when the sample is tilted that attracts attention to it. As the eyes of observer are in different positions on the head, they present different views simultaneously. This is the basis of stereopsis, the process by which the brain exploits the parallax due to the different views from the eye to gain depth perception. The differences in the two retinal images of the hexagon 306 may create the impression that the hexagon 306 floats above or below the numeral 304. The obscuring enhances the illusion of flotation above or below the surface of the substrate.

In one embodiment, which may include features described with reference to FIGS. 4-9, the pigment flakes are aligned on a transparent plastic support in a concave frame pattern, so that along a radius originating at the central image, a portion of the pigment flakes are aligned so that the angles they form with the substrate decrease from at least 70 degrees to practically zero and then increase again to 70 degrees, preferably from 80 to practically zero and to 80 degrees. The plastic support is laminated to the substrate 301 so that the magnetic coating is adjacent to the graphical component which includes the printed elements 302-304. The flakes may be thought of a forming a concave Fresnel reflector, produced by this method, produces optically real image of the light source in the direction of the observer. The dynamic frame (that is the optical image of the light source) may appear to float above the surface of the print and above the small rosette and the numeral. When the device is tilted, the optical reflective front (the bright dynamic frame) may appear to move in the direction of the tilt.

Figure 15:
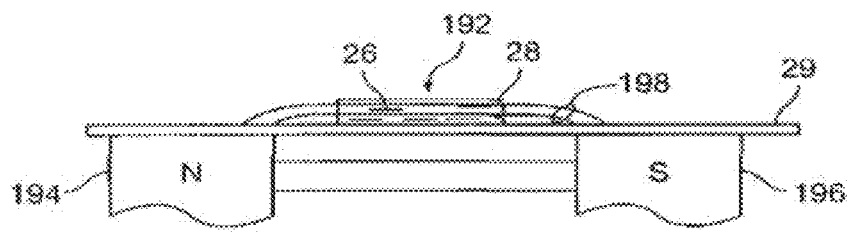
FIG. 15 illustrates a method of planarization of pigment flakes.

In one embodiment, the central image 304 may be printed using an ink with magnetically alignable flakes, wherein the concentration of the flakes in the dry ink is at least 20 wt % so as to ensure that the central image 304 is highly noticeable, and wherein the flakes are aligned parallel to the substrate in order to form a stationary image, e.g. using the method illustrated in FIG. 15, wherein magnets 194, 196 are arranged to produce magnetic field lines 198 essentially parallel to the surface of the substrate 29, which causes the magnetic pigment flakes 26 in the fluid carrier 28 to flatten out. In case a regular, non-magnetic ink is used for printing the image 304, the concentration of the ink in the image 304 can vary in a wide range, preferably being in the range of 15-25 wt %.

In manufacturing of the article discussed above with reference to FIGS. 4-9, and the articles discussed further with reference to FIGS. 11-14, the magnetically alignable pigment flakes may be aligned using a variety of magnetic assemblies, including those discussed in this application with reference to FIGS. 20-26, 29-34, 45-49, 60, 63, and 64.

The dynamic frame is not necessarily a hexagon as the frame 306 shown in FIGS. 4-9. The dynamic frame may have a variety of shapes such as a ring 306' shown in FIG. 11. Furthermore, the dynamic frame discussed above may be accompanied by an additional frame, either dynamic or stationary, wherein the first (dynamic) frame appears to move relative to the second (additional) frame when the substrate is tilted. Examples of such devices are shown in FIGS. 11, 43, 51, and 55.

Figure 10:
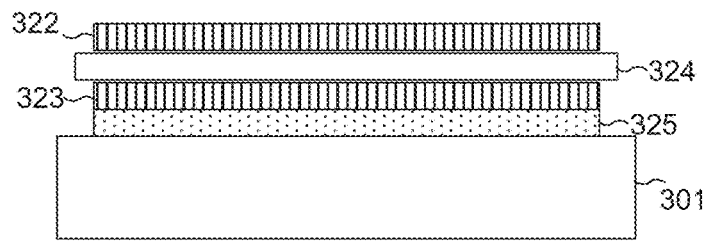
FIG. 10 is a schematic diagram of the structure of an article.

FIG. 10 illustrates a possible structure of the article formed on the substrate 301. The optical component in this case is formed of a transparent plastic support 324 coated with layers 322 and 323 of solidified binder containing magnetically aligned pigment flakes which include a magnetic or magnetizable material so as to enable the alignment. The two layers may be printed with a same or different magnetic inks; however, the concentrations of the flakes in the binder has to be within the same interval as for the printed circle 305, less than 14 wt %, preferably 4-8 wt %. An adhesive 325 may be coated on the side of the optical component for laminating to the substrate 301 over the graphical component (not shown).

Figure 11:
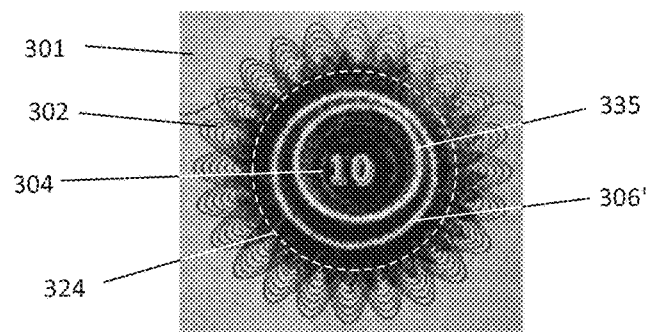
FIGS. 11-14 are photographs of an article.
Figure 12:
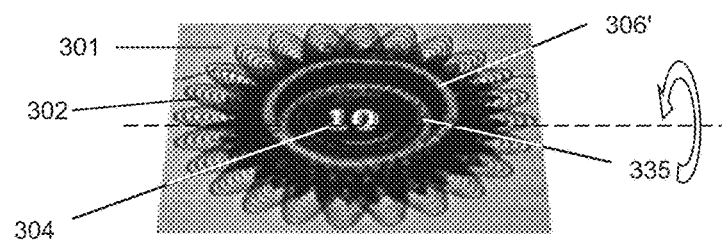

In the particular example shown in FIGS. 11-12, the substrate 301 has the Guilloche rosette 302 and the numeral 304. The transparent support 324, which may be a thin polyester sheet, was printed on one side with a transparent UV curable ink binder containing 5 wt % of Gold/Green interference magnetic pigment and aligned in magnetic field so that the aligned flakes formed a narrow gold-colored ring leaving the rest of the printed area transparent. After curing of the ink with UV light, the printed transparent support sheet was flipped upside down. The second side of the transparent sheet was also printed with a different ink containing 5 wt % of the Green/Blue magnetic interference pigment in the same binder. The ink on the second side of the transparent support sheet was exposed to the field of the same magnet which was used for aligning the ink on the first side of the support. However, the sheet was separated from the magnet by the distance of about 0.0625" thus reducing the size of the green ring that was formed by alignment of the flakes, and the ink of the second side was also cured in UV light. Essentially, the configuration of the magnetic field used for aligning the ink on the first side of the support was different from the configuration of the magnetic field used for aligning the ink on the second side of the support. The adhesive 325 was provided to the side with the Gold/Green ink and the sheet was laminated to the surface of the banknote 301.

The resulting article at the normal angle of observation is illustrated in FIG. 11. The note 301 with the Guilloche rosette 302 and the numeral 304 has a transparent polyester sheet 324 (invisible in the photographs and outlined by the dashed line for illustrative purposes) laminated to its surface over the rosette 302 and the numeral 304. The transparent sheet has a convex Green/Blue ring 335 on the top of the surface that may produce a flotation effect underneath the numeral. The concave Gold/Green ring 306' being physically underneath the sheet with the convex structure may produce an effect of a bright ring illusively floating 0.125"-0.25" above the graphical component which may be a multicolored graphical image printed on the substrate with conventional printing techniques The resulting article has two frame patterns formed of magnetically aligned flakes on the transparent support 324. For an observer looking at the article, in one ink layer the flakes are aligned in a concave frame pattern, and in another layer—in a convex pattern. Accordingly, the observer may see two bright frames 306' and 335 which move in opposite directions, whereas one bright frame may appear to float above the substrate, and another bright frame—below the surface of the article. In this particular example, the two bright rings appear to float in two planes separated by a space close to 0.25". The presence of the second bright frame creates an illusion that the numeral 304 floats between the two bright frames, or on the top of an imaginary stem, or neck, which extends between the two bright frames 306' and 335. Additionally, having the smaller ring at the "bottom" of the stem creates the perspective customary used in paintings, which contributes to the illusion of depth in the image formed by the article when irradiated with light.

When the sample is tilted with its upper edge away from the observer as shown in FIG. 12, the green ring 335 formed by a convex frame pattern, may appear to be underneath the numeral 304 and floating toward the observer. The larger gold ring 306', formed by a concave frame pattern, may appear to float in the direction of the tilt. The rings move in opposite directions and, with the tilt, come to the point when the large gold ring 306' overlaps the green ring 335. Overlapping of two objects, called "occlusion," is one of the most important attributes of the depth perception. The sample produces an eye-catching effect of the numeral 304 apparently floating between two surrounding moving bright rings. The effect is purely illusive because the numeral 304, being non-dynamic, doesn't move. However, the bright frames 335 and 306' became new reference frames for the numeral 304 (after their magnetic alignment) thus providing new set of coordinates for the numeral 304 resulting in its illusive flotation.

Generally speaking, the bright frame 306 is not a contour of the central image 304; there may be a gap between the frame 306 and the image 304, more so that the bright dynamic frame 306 appears to move whereas the image 304 appears to be stationary. Advantageously, the two prints made with the different inks are not required to be perfectly in register.

The second coating 305 may surround the central image 304 only partially, i.e. have gaps in some radial directions originating at the central image 304, totaling to not more than in a quarter of the circle. Accordingly, the frame pattern formed of the magnetically alignable flakes and the dynamic frame 306 formed by reflected light may surround the image 304 only partially.

Other alignment techniques discussed below may result in the second bright frame being stationary with respect to the substrate 301 and thus, to the numeral 304. The relative movement of the two bright frames relative one another may also produce the effect of a stem supporting the image 304 so that the image 304 moves below or above the substrate supported by and attached to the substrate by the illusionary stem between the two bright frames.

Figure 61:
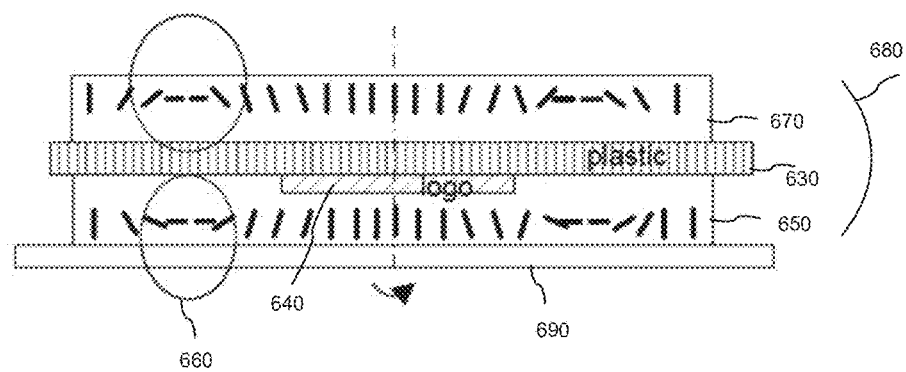
FIG. 61 is a schematic diagram of an article.
Figure 62:
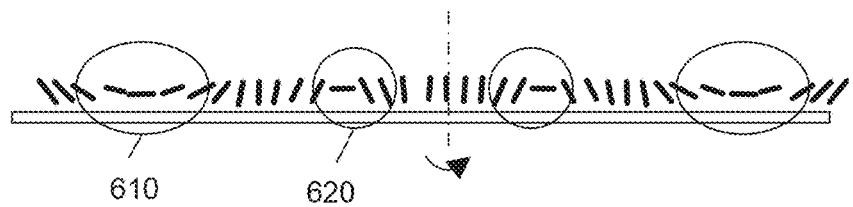
FIG. 62 is a schematic diagram of an article.

The striking effect produced by the two bright frames moving relative one another may be utilized with or without an image within the frames. An article may include a substrate and an optical component supported by the substrate. The optical component, e.g. a coating, contains magnetically alignable pigment flakes having a magnetic or magnetizable material, dispersed in a binder. The optical component has a first curved region with a first plurality of magnetically alignable pigment flakes; in cross sections of the first curved region, the pigment flakes are aligned in a first arching pattern so that light reflected from the first plurality of pigment flakes provides an image of a first bright frame. The optical component also has a second curved region, possibly different from the first curved region, with a second plurality of magnetically alignable pigment flakes providing an image of a second bright frame. The first bright frame is a dynamic frame which appears to move relative to the substrate and to the second bright frame when the substrate is tilted. The first and second pluralities of the flakes may be in a same layer of an optical component, then the first curved region is different from the second curved region. The first and second pluralities of the flakes may be in different layers of the optical component, e.g. layers deposited on the substrate and aligned in separate steps; then the first and second curved regions may be different or coincide i.e. be one above another. The first and second pluralities of the flakes may be in a same layer or in different layers of an optical structure, as shown in FIGS. 62 and 61. In addition to the optical component, the optical structure may or may not include a central image. In the first and second curved regions the pigment flakes may be aligned in arching patterns which arch in opposite directions so that the first and second bright frames appear to move with respect to the substrate and to each other when the substrate is tilted.

An article shown in FIG. 62 may have features described with reference to the article shown in FIGS. 4-9. The article has first and second curved regions I the form of two rings with cross-sections 610 and 620. In the first curved region, pigment flakes are aligned in a first arching pattern 610 so that the first dynamic frame appears to move when the substrate is tilted. In the second curved region, pigment flakes are aligned in a second arching pattern 620 so that the second bright frame may appear to move when the substrate is tilted. The first and second arching patterns may arch in same or opposite directions.

The article shown in FIG. 62 has rotational symmetry, and the first and second curved regions are rings of different radii. However, the first and second curved regions can coincide as in the embodiment shown in FIG. 42, wherein the first arching pattern 546 and the second arching pattern 548 are in the same curved region, possibly a ring, having a cross section 554. In both embodiments shown in FIGS. 42 and 62, the substrate supports a coating with aligned pigment flakes. The coating has the first and second curved regions which can be different or can coincide. In cross-sections of the first and second curved regions, first and second pluralities of pigment flakes are aligned in first and second arching patterns, respectively. Preferably, the first and second arching patterns are maintained along the first and second curved regions, respectively, and arch in opposite directions. Light reflected from the first plurality of pigment flakes provides an image of a first bright frame, and light reflected from the second plurality of pigment flakes provides an image of a second frame, wherein the first frame appears to move relative to the second frame when the substrate is tilted, and preferably the first and second frames appear to move in opposite directions.

Figure 49:
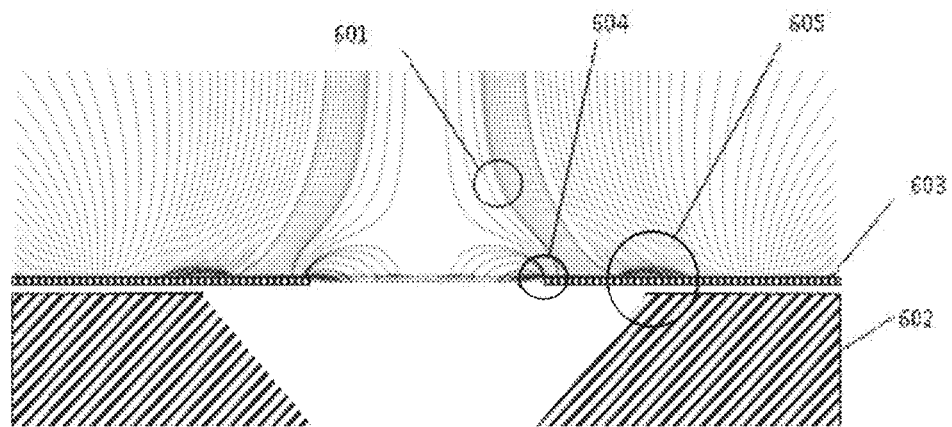
FIG. 49 is a schematic diagram of a magnetic field.

In one embodiment, magnetically alignable pigment flakes in the first curved region are aligned in a first arching pattern, whereas magnetically alignable pigment flakes in the second curved region are aligned in with the second arching pattern of the radius substantially smaller than the radius of the first arching pattern so that the motion of the second bright frame is so small that the second bright frame appears static when the substrate is tilted as discussed in more detail with reference to FIG. 49.

Figure 13:
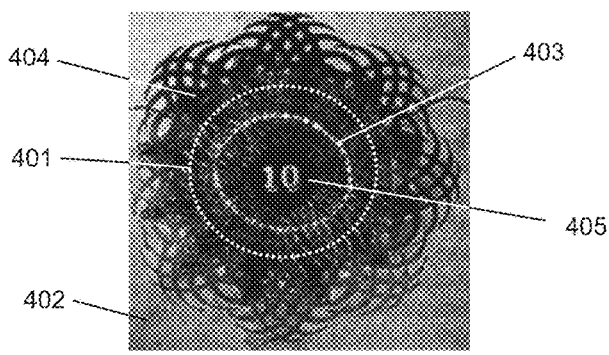
Figure 14:
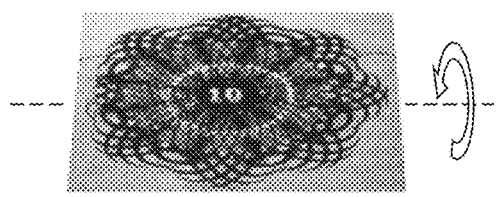

An article with a different kind of occlusion is shown in FIG. 13. A round region 401 (outlined with white dashed line for visibility) of the substrate 402 was coated with ink containing magnetically alignable interference Green/Blue pigment flakes dispersed in a binder. The wet ink having the low concentration as described with reference to FIG. 4, was exposed to the field of a permanent magnet so that an arching pattern for producing a dynamic ring 403 was formed in the ink. The ink was cured with UV-light. In a next step, the round region 401 was overprinted with a second ink containing non-magnetic, i.e. not alignable in the presence of the magnetic field used for the alignment of the optical component 401, Gold/Green interference pigment. The second ink was printed in the shape of the rosette pattern 404. The pattern has openings in order to make the motion of the ring 403 at least partially visible. Because the ring 403 may be perceived as floating underneath the pattern 404 and the numeral 405, the occlusion created by overlapping the green ring by the highly visible mesh-like pattern of the rosette 404 may enhance the illusion of depth. In this embodiment, the second ink may be any non-magnetic ink with a concentration of pigment particles of at least 20 wt %. Alternatively, the second ink may contain magnetically alignable flakes in a concentration of at least 20 wt %; when the binder is solidified, the flakes lie parallel to the surface of the substrate 402 so that the image formed by the second ink be a stationary image having gaps wherein the movement of the bright frame 403 could be visible. The dynamic frame 403 may be a square, hexagon, etc. FIG. 14 shows the same article with its upper edge tilted away from an observer. In this example the first and second ink contained color shifting interference pigments; however, non-color shifting pigments may also be used in one or both inks. By way of example, the optical component supported by the region 401 of substrate 402 may be printed with a first ink containing a transparent binder with reflective silvery flakes having a magnetic or magnetizable layer. The second coating making the graphical component, which is supported by the optical component and the substrate 402, may be printed with a conventional non-color shifting, non-magnetic ink. In this embodiment, the moving frame 403 is only partially visible and thus partially surrounds the central image, which is not necessarily a numeral, as shown, and may be a symbol, logo, or a localized image which preferably fits into the frame 403. Preferably, the visible sectors of the frame combine to measure at least 180 degrees, and better 270 degrees.

Figure 16:
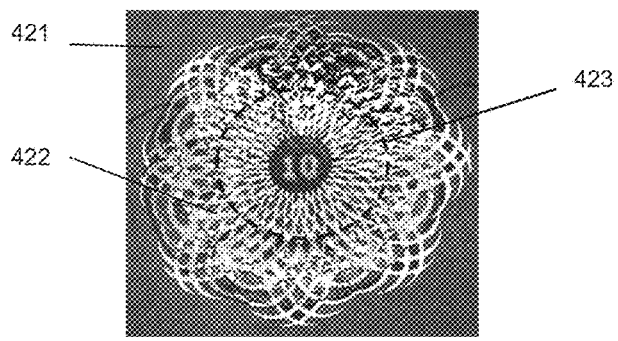
FIGS. 16-18 are photographs of an article.
Figure 17:
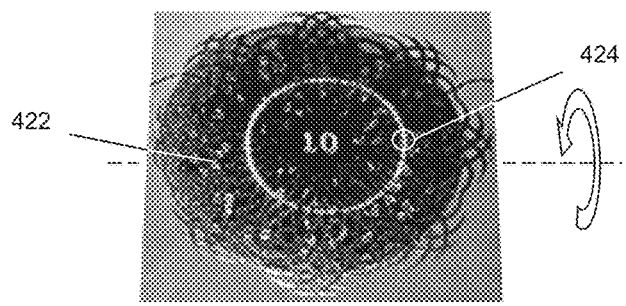
Figure 18:
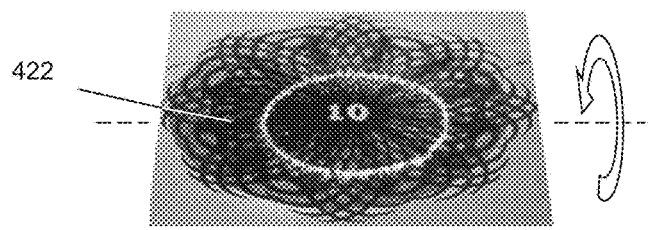

With reference to FIGS. 16-18, a graphical component in the form of a pattern 422 has been printed on a substrate 421 with a first ink, and contains a solidified binder and Gold/Green interference pigment particles in a concentration of 20-25 wt %; the first pigment particles may be non-magnetic pigments, or magnetically alignable pigments planarized as illustrated in FIG. 15. A round region 423 (outlined with a black dashed line for visibility) of the pattern 422 has been coated with a second ink so as to form an optical component supported by the substrate 421. The second ink contains a binder and second pigments in a concentration of 5 wt %. The second pigments are interference magnetic Gold/Green pigment flakes providing the same Gold/Green color shift as the pigments in the graphical component. The wet ink was exposed to the magnetic field and the pigment particles were aligned along magnetic lines forming a narrow ring leaving the rest of the magnetic print transparent. The ring is not visible at the normal angle of observation as illustrated in FIG. 16, because the pattern 422 and the ring 424 are printed with pigment having the same color characteristics. When the sample is tilted away from the observer as shown in FIG. 17, the Gold/Green pigment particles of the pattern 422 start to change their color from Gold to Green while the gold ring 424 keeps the same color at the tilt. The pattern 422 has dark-green color at high angles as shown in FIG. 18 while the ring 424 keeps its gold appearance. The moving frame 424 may be a square, etc., and the central image is not necessarily a numeral, as shown, and may be a symbol, logo, or a localized image which fits into the frame 424.

In the embodiment shown in FIGS. 16-18, the first and second pigments produce the same Gold/Green color shifting effect. The second pigments are pigment flakes each including a magnetic or magnetizable material for aligning the flakes in the frame pattern which exhibits the ring 424. The first pigments may or may not include a magnetic or magnetizable material. The concentrations of first ink is different from the concentration of the second ink. The first ink used for printing the graphical component may have the concentration of first pigments in the first binder in the range of 5-30 wt % and preferably between 20 and 25 wt % for screen printing presses and 25 to 30 wt % for Intaglio printing presses. The second ink used for the optical component may have the concentration of second pigments in the second binder in the range of 4-14 wt % and preferably between 5 and 8 wt %. The article shown in FIGS. 16-18 provides a metameric effect made with two prints of the same pigment. At the normal angle (FIG. 16), the observer can see the gold pattern 422 because it is larger than the ring 424. When the article is tilted, the pattern 422 changes its color to green, while the ring 424 keeps its gold appearance. The gold on the top of green has a high contrast that makes it very visible. In general, the first and second pigments in the first and second ink may have same color same color characteristics, e.g. produce a same color shifting effect.

In the articles described herein, the bright dynamic frame may be in the form of a ring, oval, hexagon, square, or other polygonal shape. Preferably, the dynamic frame is closed around the central image, e.g. a symbol, logo, etc. Alternatively, the dynamic frame may consist of one or more sectors divided by one or more gaps, so that the sectors combine to measure at least 180 degrees, and preferably not less than 270 degrees. The gaps may result from the absence of magnetically alignable pigment flakes in a particular region or from magnetically alignable flakes being hidden, e.g. by a stationary element such as the graphical component. In addition, the dynamic frame can be surrounded by the graphical image.

Figure 19:
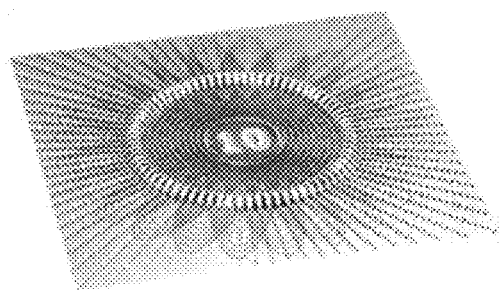
FIG. 19 is an illustration of an article.

A variety of magnets or magnetic assemblies can be used for producing the same effect. By way of example, FIG. 19 shows a ring formed by an arching alignment of pigment flakes, e.g. such as a pattern 524 (FIG. 38), wherein the arching pattern is maintained in radial cross-sections along a circular path on a surface of a substrate. FIG. 19 schematically shows an arching alignment that forms the ring and near vertical alignment in all other regions of the print. The article shown in FIG. 19 may have features described with reference to the article shown in FIGS. 4-9, with the exception that the dynamic frame has a different shape; in FIG. 19 the dynamic frame is a dynamic ring.

Figure 20:
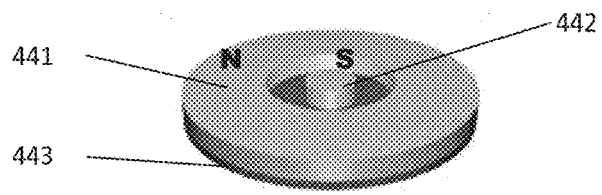
FIG. 20 is a schematic diagram of a magnetic assembly.
Figure 21:
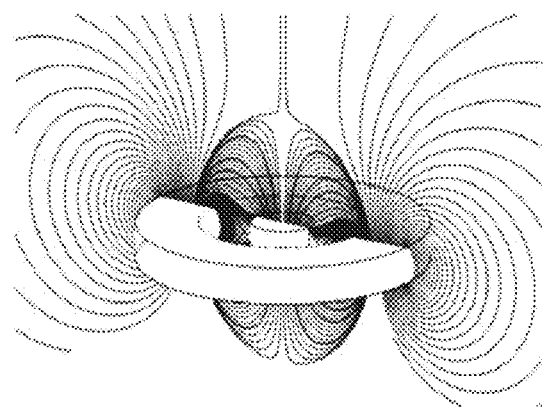
FIG. 21 is a schematic diagram of a magnetic field.

With reference to FIG. 20, a magnetic assembly for manufacturing the article shown in FIG. 19 has two magnets mounted on the top of a base; the base is preferably made of [ferromagnetic metal preferably cold rolled steel. A ring-shaped magnet 441 rests on a steel base 443, and a cylindrical magnet 442 is located in the center opening of the magnet 441. The magnets generate the field illustrated in FIG. 21.

Figure 22:
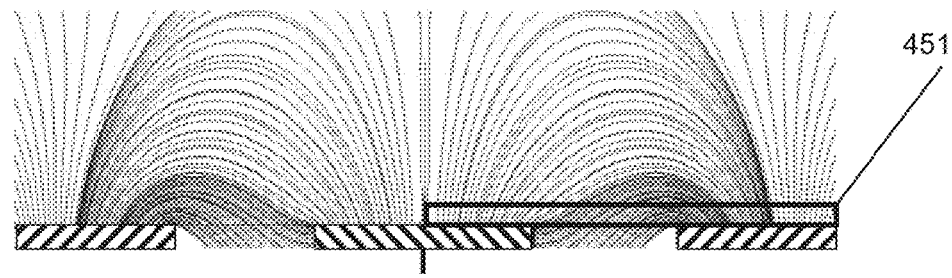
FIG. 22 is a schematic diagram of a magnetic field.
Figure 23:
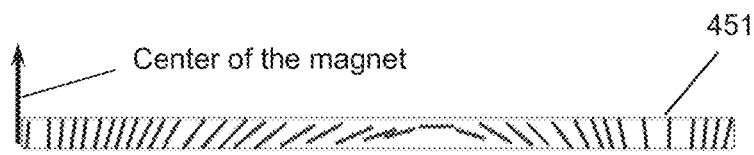
FIG. 23 is a schematic diagram of a cross section of an article
Figure 24:
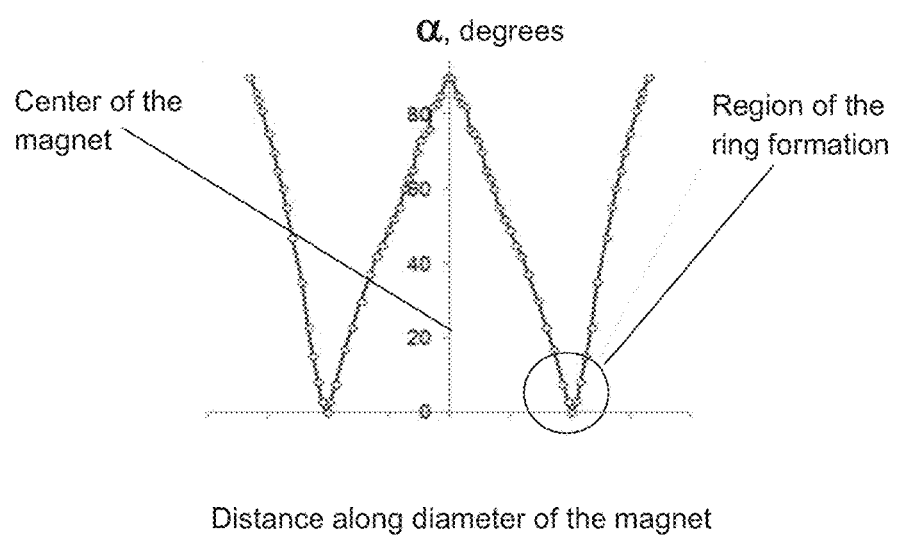
FIG. 24 is a plot of angles formed between flakes and a substrate.

FIG. 22 illustrates a cross-section of the field produced by the magnetic assembly in close proximity to the top of the magnet; the cross-section is taken along a diameter of the magnetic assembly. A box 451 in FIG. 22, schematically representing a layer of liquid magnetic ink, indicates a portion of the field which has aligned the flakes as shown in FIG. 23. FIG. 24 is a plot of angles formed between the aligned pigment flakes (FIG. 23) and the substrate supporting the optical component, along a diameter (from edge to edge) of the large magnet (FIG. 20).

Figure 25A:
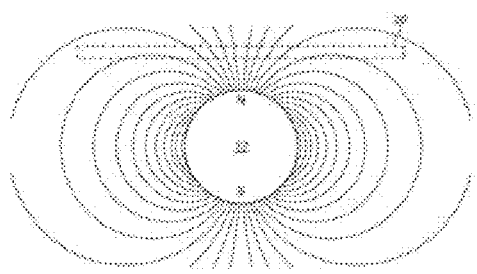
FIG. 25A is a schematic diagram of a field generated by a spherical magnet.
Figure 25:
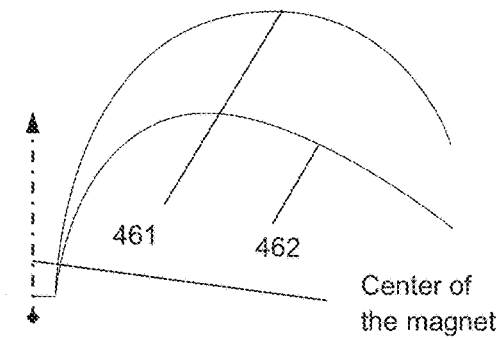
FIG. 25 is plots of head-to-tail connections of flakes.

With reference to FIG. 25A, a head-to-tail connection of flakes shown in FIG. 23 produces a curve 461 illustrated in FIG. 25, whereas a curve 462 represent flakes aligned in the field of a spherical magnet shown in FIG. 25A. Because the curve 461 is more round than the curve 462, the reflective surface produced by revolving the curve 461 around the center of the magnet generates a significantly better pronounced bright ring than the reflective surface produced by the curve 462. The angles of the flakes increase slowly at the periphery of the curve 462 and do not reach the near-normal values achieved by the angles in FIG. 24 and the curve 461 in FIG. 25A. Accordingly, the ring formed by flakes aligned in accordance with the curve 462 (FIG. 25A) has a shallowing-out effect which results in shadows and dilution of the bright ring, i.e. when the article is tilted with respect to the light source, the region that is closer to the observer becomes bright and the region on the opposite side of the article becomes dark. In case the optical component is printed with color shifting flakes, the shallowing-out effect produces shadow regions which change their color when the object is tilted.

Therefore, it is preferable to use a magnetic field such that, along the majority of radial directions, the minimal angles that the field lines form with the substrate decrease from 70 degrees to zero and then increase to 70 degrees, more preferably from at least 80° to zero and then again to 80°; ideally—from normal, to zero, and again to normal angles. Consequently, it is preferable that along at least one of the plurality of radial directions originating at the central image, angles that the pigment flakes form with the substrate decrease from 70 degrees to practically zero (the majority of flakes in a small area are parallel to the substrate) and then increase to 70 degrees; more preferably from 80° to practically zero and then again to 80°. Although the effect is explained with reference to a cylindrically-symmetric magnetic field and a ring-shaped bright dynamic frame, the same goes to any form of the dynamic frames, e.g. square, hexagonal, etc. frames and corresponding magnetic assemblies.

Figure 26:
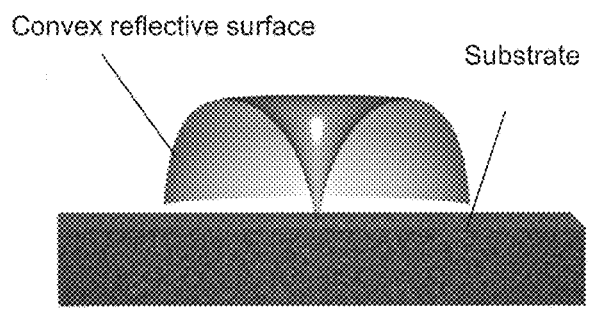
FIG. 26 is an illustration of a convex reflective surface.

FIG. 26 illustrates a convex reflective surface reconstructed from the head-to-tail connection of particles shown in FIG. 23 by revolving the curve 461 (FIG. 25A) around the axis going through the center of the magnetic assembly. The surface produces a virtual image of a light source in the shape of an oval or a ring below the substrate if the focal points of the reflector are located there; also see FIG. 34.

Figure 27:
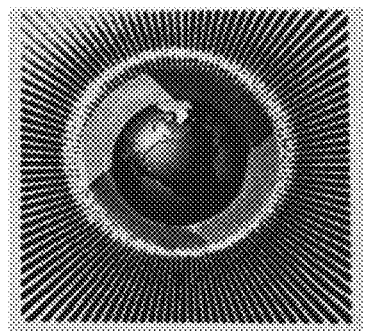
FIGS. 27 and 28 are photographs of an article.

FIG. 27 shows an article with pigment flakes aligned with the magnetic assembly shown in FIG. 20. The article shown in FIG. 27 may have features as the article shown in FIGS. 4-9, with the following differences. A graphical component includes a star-like pattern, which serves as a background pattern as the rosettes 302 and 303 in FIG. 4. The graphical component also includes an Earth image in the middle, which serves as a central image as the numeral "10" in FIG. 4. The graphical component was completely coated with a transparent ink vehicle containing 7.5 wt % of aluminum coated magnetic pigment aligned in the magnetic field illustrated in FIG. 21. As shown in the plot (FIG. 24), the pigment flakes are vertical to the substrate (90°) in the center of the magnet that makes them invisible in the picture (FIG. 27) because they are staying on their edges. The pigment flakes in the optical component become visible in the picture when their orientation approaches the horizontal axis and the pigment flakes eventually become parallel to the substrate. The picture shows a bright ring which is a dynamic ring appearing to move when the article is tilted relative to a light source. An observer may perceive that the dynamic ring moves underneath the Earth which creates the illusion of the Earth's flotation above the ring. Outside of the bright ring, the increase of the angles which the pigment flakes form with the substrate along the radius of the magnet (from the center to the outside) makes the flakes invisible again at the periphery of the bright ring when the article is observed at the normal angle.

Figure 28:
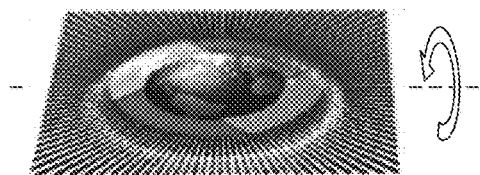

Tilting of the sample with its upper edge away from the camera may generate the illusion of the dynamic ring floating underneath the globe (FIG. 28).

Outside of the dynamic ring, the graphical pattern printed underneath the magnetic ink can be easily observed; it is not obfuscated with unwanted reflections.

Figure 60:
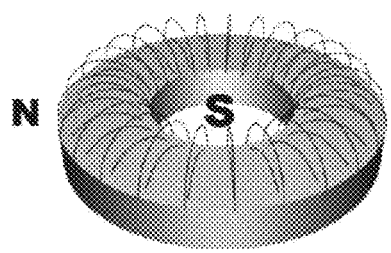
FIG. 60 illustrates a magnet.

FIG. 60 illustrates another magnetic assembly for aligning pigment flakes to produce the dynamic ring shown in FIG. 19. The assembly has a ring-shaped magnet with radial magnetization. One pole of the magnet is inside of the ring and another pole is on the outer side. The lines of the magnetic field emerge from one pole to another. When wet ink containing magnetic or magnetizable pigment particles is placed either directly on the magnet or at some distance from it, the pigment particles align themselves in a convex annular arrangement schematically shown in FIGS. 21-23.

Figure 29:
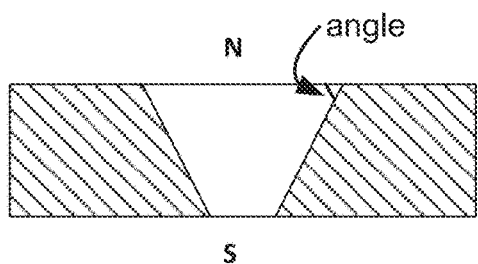
FIGS. 29 and 30 illustrate a magnet.
Figure 30:
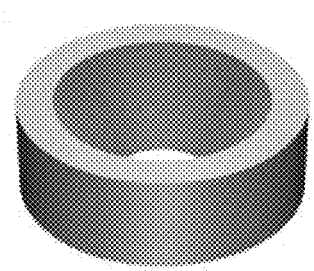
Figure 31:
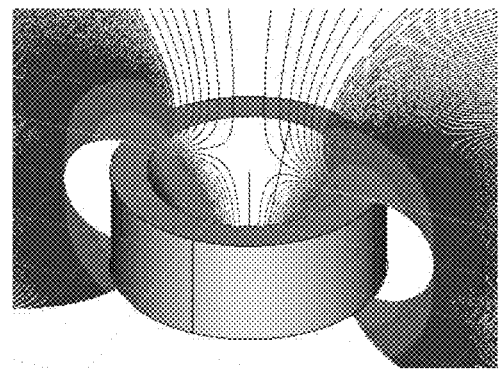
FIG. 31 is a schematic diagram of a magnetic field.
Figure 32:
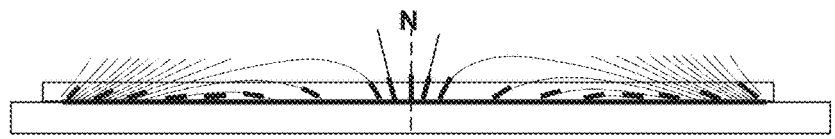
FIG. 32 is a schematic diagram of flake alignment.
Figure 33:
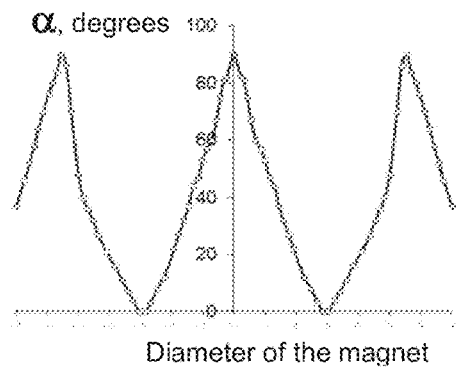
FIG. 33 is a plot of angles formed by pigment flakes with a substrate.
Figure 34:
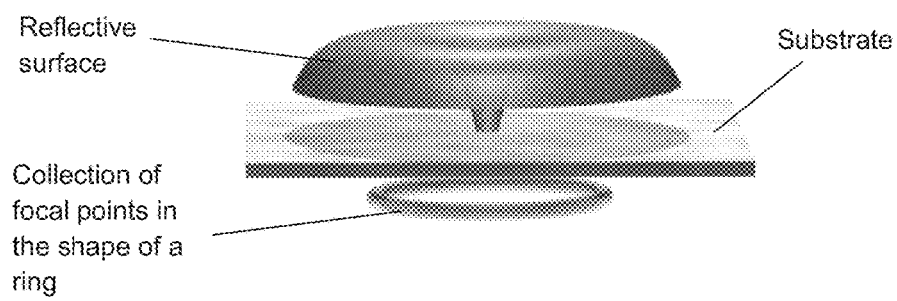
FIG. 34 is an illustration of a reflective surface.

With reference to FIG. 29, a magnet for manufacturing the article shown in FIG. 19 has a through (extruded), tapered cut, and provides a remarkable motion effect, characterized by a long travel of the ring at the tilt of the article and by a significant illusive depth of the effect. The orthogonal view of the round magnet is shown in FIG. 30. The angle of the cut may vary in the range of from 30° to 120°. The wide opening of the cone cut is preferably facing the substrate, i.e. the preferable range of for the angle of the cut is between 30° to 90° and more preferable between 30 and 60°. The field generated by the magnet (FIGS. 29 and 30) is shown schematically in FIG. 31, the alignment of the flakes—in FIG. 32, and the angle distribution of the angles the flakes form with the substrate—in FIG. 33. A reflective surface calculated from the head-to-tail connection of particles in the layer of ink vehicle is shown in FIG. 34; the surface is an annual convex reflector which produces a virtual image of a light source in the form of a ring.

A cross-section of an article formed with the magnet described with reference to FIGS. 29 and 30, is schematically shown in FIG. 3. The article illustrated in FIG. 3 may have features described with reference to the article shown in FIGS. 4-9, with the following differences. A substrate 501 is printed with a graphical component including a background pattern 502 and an informative image 503 in a first ink printed with conventional techniques. The graphical component formed with the first ink may be overprinted with an optical component printed with a second ink which includes a clear binder 504 with pigment flakes having a magnetic or magnetizable material; the pigment flakes are aligned in the magnetic field of the magnet illustrated in FIG. 31. The flakes in regions 505 and 506 are aligned normally to the substrate, and the flakes in annular region 507 are aligned as a Fresnel annular convex reflector. As discussed above, the optical component may be formed under the graphical component or on a transparent plastic support and attached to the substrate 501.

Figure 35:
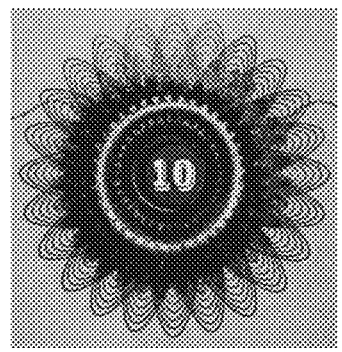
FIGS. 35 and 36 are photographs of an article.
Figure 36:
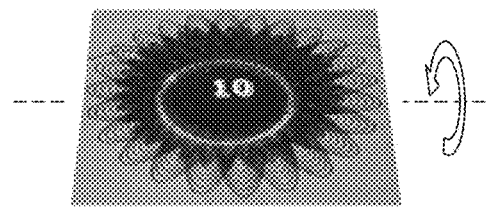

FIGS. 35 and 36 are photographs of an optical device produced with the magnet shown in FIG. 30. In FIG. 35 the device is shown at the normal angle of observation, and FIG. 36 shows the device tilted with its upper edge away from the camera. Note, that when the upper edge of the device is tilted away, the ring moves toward the camera.

A method for making an article includes providing a coating of a liquid binder having pigment flakes therein onto a substrate, exposing the pigment flakes to the field of a magnet having a tapered cut through the magnet in the form of a funnel or countersink cut (FIGS. 29 and 64) between the top and bottom surfaces of the magnet, and solidifying the binder so as to form an optical component. The pigment flakes include a magnetic or magnetizable material. Prior or after providing the optical component, the substrate may be provided with graphical component in the form of another coating, supporting or supported by the optical component. The substrate whereon the optical component is formed may be a thin transparent support sheet. After forming the optical component, the support sheet is attached to another substrate, which receives the graphical component before or after attaching the support sheet. By way of example, as a concave optical document security device may be formed with the help of the magnet shown in FIG. 30 thus creating an annular convex reflector schematically shown in FIG. 37.

With reference to FIG. 37, a transparent plastic substrate (a support sheet) 521 is coated with the ink 522 containing magnetic platelets (pigment flakes) 523 oriented in an external magnetic field. Regions 524 of the structure are oriented as an annular convex Fresnel reflector. The rest of the platelets are oriented normally to the substrate in all other regions of the article. The ink 522 is solidified after completion of the alignment with any suitable method (drying, UV or e-beam irradiation, microwave, etc.). The light rays 525 from the light source 526 illuminate a convex flake pattern in the region 524 and form a virtual image 527 of a distant point light source. The virtual image 527 is located underneath the substrate 521.

The next step includes flipping the printed transparent substrate 521 upside down and laminating it to a flexible substrate bearing a graphical image. The convex alignment of the flakes on the transparent plastic sheet becomes a concave annular reflector after lamination to the substrate 528. A cross-section of the resulting article which may be used as a concave security device is illustrated in FIG. 38. A substrate 528, which is preferably an opaque substrate, is printed with a graphical component containing a background 529 and a logo or the numeral 530 on the top of the background 529. The region 524 of the magnetically oriented platelets has formed a concave Fresnel annular reflector. The light rays 525 from a distant point source are reflected back forming now a real image 527 of the source 526. Because the image 527 is a real image and is located above the reflector in the direction of the light source, the image may be perceived as floating above the surface of the substrate.

Figure 39:
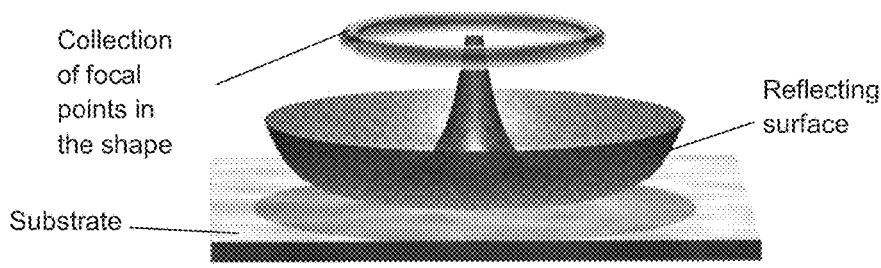
FIG. 39 is an illustration of a reflective surface.

A reconstructed reflecting surface producing concave reflection is illustrated schematically in FIG. 39.

Figure 40:
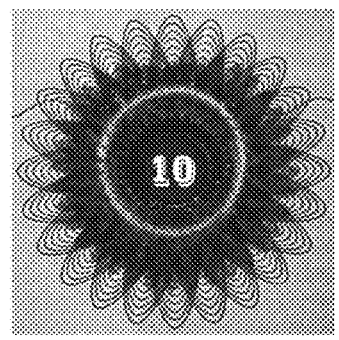
FIGS. 40 and 41 are photographs of an article.
Figure 41:
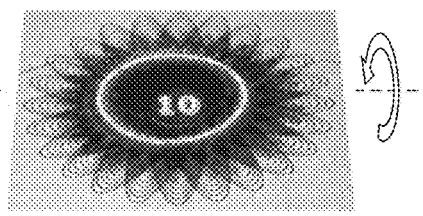

FIG. 40 shows the resulting security device at the normal angle of observation; the device appears to be similar to the convex device shown in FIG. 35. At the tilt of the device, when the upper edge of the device is tilted away (FIG. 41), the dynamic ring moves away from the camera. In other words, the motion effect of the concave optical device appears to be opposite to the motion effect of the convex device.

It is preferable to have the concentration of the magnetic pigment particles in the ink in the range 4-14%, preferably not higher than 10% by weight so as to eliminate dark regions between the background, bright dynamic ring, and symbol. The pigment flakes in these regions are tilted at some "intermediate" angles between the directions normal and parallel to the substrate. While the horizontally (parallel to the substrate) and near-horizontally aligned flakes are bright in reflected light and produce the dynamic ring, and the vertical and near-vertical flakes reflect very little light and are practically invisible at relatively small tilt angles e.g. when an observed has a document in hand, the intermediately tilted flakes would be noticeable as a grey region, or a shadow, in the event the concentration of the flakes is sufficiently high, e.g. 15 wt % or higher.

By way of example, a 15% concentration already makes noticeable shadows between the background, bright ring, and symbol and thus destroys the effect of the symbol and ring floating together.

Figure 42:
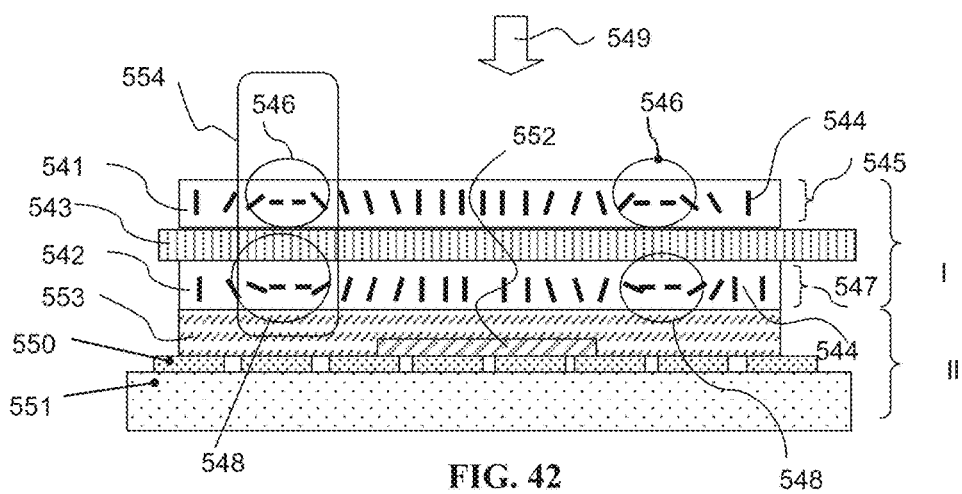
FIG. 42 is a schematic diagram of an article.

With reference to FIG. 42, a combined concavo-convex device has two parts I and II assembled together. A first fabrication step is manufacturing of an optical component (I): two layers of magnetic ink 541 and 542 have been printed separately on both sides of a thin transparent plastic substrate 543 in two separate printing steps, each printing step includes alignment of the pigment flakes using the magnet illustrated in FIG. 31, and at least partially fixing the binder. In each of the ink layers the pigment flakes 544 have been aligned so as to form an annual convex reflector on each side of the substrate 543. The layers constitute a first optical structure 545 containing an annual convex reflector 546 and a second optical structure 547 containing an annual concave reflector 548, wherein the "concave" and "convex" properties relate to the observation direction 549. The rest of the magnetic flakes 544 in remaining areas of magnetic inks had been aligned at steep angles (almost normal) to the substrate. The normal alignment has made these platelets almost invisible for observation when the concentration of the flakes in the binder is sufficiently low. The ink layers 541 and 542 may contain same or different pigment flakes in a binder. The pigment flakes in both ink layers necessarily include a magnetic or magnetizable material for alignment of the flakes. Magnets and magnetic assemblies other than one shown in FIG. 31 may be used, including the use of different magnets for the first and second ink layers. In a second fabrication step, a graphical component including a background security image 550 and a central image 552 may be printed on a substrate 551, e.g. a flexible web or paper, by any suitable printing technique; however, in the presence of two frames, the graphical component and thus the second fabrication step are optional.

In a third fabrication step, the optical component is laminated to the substrate 551 using an adhesive. The adhesive 553 may be printed on the top of the graphical image 552. The resulting device provides a remarkable illusion of depth.

The resulting article may include features described with reference to FIGS. 4-9, however it has two dynamic frames, which are dynamic rings in this particular example. The two frames moving relative to one another and with respect to the substrate create a striking effect and may be used as a security feature without a central image surrounded by the frames; however using the image would further increase the effect of the article.

Figure 43:
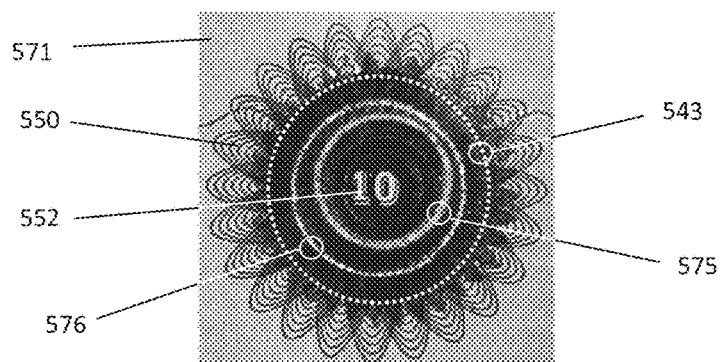
FIGS. 43 and 44 are photographs of an article.
Figure 44:
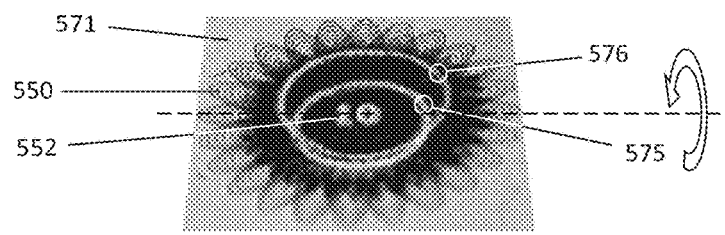

FIGS. 43 and 44 provide an example of an article formed as discussed above with reference to FIG. 42. The article shown in FIGS. 43 and 44 may include features described with reference to FIGS. 4-9 and FIGS. 11 and 12.

A note 571 has a Guilloche rosette 550 and a central image 552 in the form of the numeral "10". A thin transparent polyester sheet 543 was printed on one side with transparent UV curable ink binder containing 5 wt % of Gold/Green interference magnetic pigment and aligned in magnetic field until the pigment had formed narrow gold-like ring leaving the rest of the printed area transparent. The printed transparent sheet was flipped upside down after curing of the ink with UV light. The second side of the transparent sheet has also been printed with the same binder containing 5 wt % of the Green/Blue magnetic interference pigment. The sheet with the fresh ink was exposed to the field of the same magnet. The sheet was separated from the magnet by the distance close to 0.0625" that has allowed reducing the size of the green ring that has been formed by alignment of the flakes, and the ink of the second side was also cured in UV light. The adhesive was laminated to the side with the Gold/Green ink and the sheet was laminated to the surface of the banknote. Schematic structure of the device is illustrated in FIG. 42. The transparent polyester sheet 543 was coated with layers 541 and 542 of magnetic ink aligned in external field. The adhesive 553 was coated on the side with the Gold/Green pigment and laminated to the substrate 551 over the background 550 and the central image 552. Each of magnetic layers was oriented as a convex reflector in the field of the same magnet. However, both of them were printed on opposite sides of a transparent substrate 543 that has made the optical structure next to the surface of the banknote as a concave reflector. The convex structure produces an optical effect as if the enclosed annular frame feature is floating underneath the surface of the print while the concave structure produces an effect as if the enclosed annular frame feature is floating above the surface. Having both these effects in the same device produces overall effect as if the numeral is floating between two rings separated from each other by a space close to 0.25".

FIG. 43 is a photograph of the article described with reference to FIG. 42, at the normal angle of observation. The article forms a convex Green/Blue ring 575 which appears to float underneath the numeral. The concave Gold/Green ring 576 printed on the reversed side of the polyester support and laminated adjacent to the substrate generates a real image of the light source in the form of a larger ring which appears floating at some distance above the numeral.

The size of the green ring 575 was selected smaller with a particular purpose. Having the smaller ring at the "bottom" of the stem creates the perspective customary used in paintings which contributes to the illusion of depth in the image formed by the article when irradiated with light.

When the sample is tilted with its upper edge away from the camera as shown in FIG. 44, the green ring 575, produced by a convex alignment of the pigment flakes, appears to float toward the camera visually underneath the numeral. The larger gold ring 576, produced by a concave alignment of the pigment flakes, appears to float in the direction of the tilt, away from the camera and above the numeral. The rings move in opposite directions, and at a certain tilt the large gold ring may partially overlap the green ring. The central portion of the graphical component with the numeral, in its own turn, seems to overlap the green dynamic ring as the ring appears to move under the numeral. Overlapping of objects, called "occlusion," enhances the perception of depth. An observer may see an eye-catching effect as if the numeral floats between two surrounding moving rings.

Figure 45:
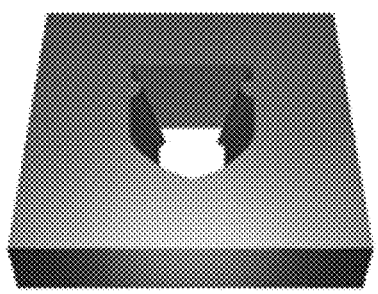
FIGS. 45 and 46 illustrate magnets.
Figure 46:
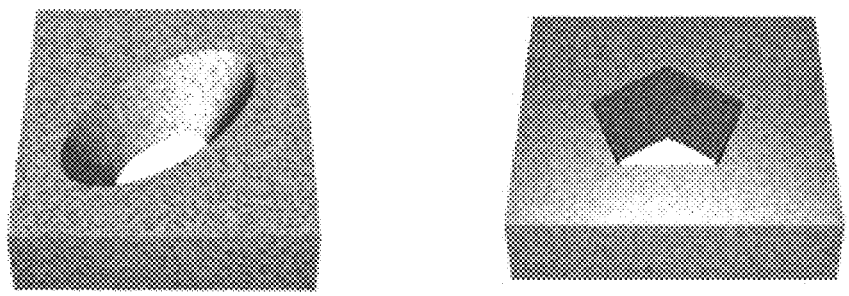

A variety of magnet shapes including those shown in FIGS. 45 and 46 may be used for manufacturing of enclosed convex and concave optical devices such as the articles described above. It is advantageous to use magnets which have North and South poles on the top and bottom surfaces of the magnet, and a through cut between the top and bottom surfaces, as shown in FIGS. 30, 47, 45 and 46. Preferably, the top and bottom openings of the cut are different in size. The difference is determined by the angle of the extruded cut. In operation, the larger opening is proximate to the substrate supporting the magnetically alignable flakes, whereas the smaller opening is distal from the substrate. The cut may be a funnel cut, e.g. in the form of a cone, or have a "staircase" profile formed by stacking two or more magnets having e.g. cylindrical openings of different diameters. The openings in the stacked magnets may have a variety of forms wherein the higher magnet has an opening with a larger diameter than an opening in the lower magnet.

The concave and convex reflectors formed by alignment of the flakes may be produced in by sequential printing of two ink layers onto a transparent plastic support substrate 543 (FIG. 42), aligning flakes in the first layer using a magnet shown in FIG. 30, and, when the first layer is dry, aligning flakes in the second layer using another magnet shown in FIG. 30placed at the other side of the substrate 543. The entire length of the transparent substrate 543 may be printed with magnetic ink, and magnetic flakes may be aligned in the field of the magnet shown in FIG. 30. After that, the substrate may be flipped with its upper side down, and the process may be repeated with the same magnet. The prints on one side of the transparent support have to be in register with prints on another side of the support sheet.

With reference to FIG. 61, a graphical component including a central image such as a symbol or logo 640 may be printed on a transparent plastic substrate 630, and coated with a first layer 650 of an optical component wherein pigment flakes are magnetically aligned in a binder so as to produce a frame pattern having a cross-section 660. So far, the article has been manufactured as the article described with reference to FIGS. 4-9 and includes the features of the aforedescribed article. Additionally, a second layer 670 of the optical component may be provided onto the second side of the substrate 630, including magnetically alignable pigment flakes in a liquid binder. After the pigment flakes are aligned using a magnet, e.g. one shown in FIG. 30, and the binder is solidified, the resulting article has a two-layer optical component, wherein each layer reflects a dynamic frame surrounding the central image 640. The optical component shown in FIG. 61 is manufactured and has the same structure as the optical component I shown in FIG. 42, with an addition of the graphical layer 640, and the optical component shown in FIG. 61 provides the same dynamic effect as described above with reference to FIG. 42. The article 680 may be used e.g. as a substrate for plastic-based banknotes, or may be attached to a carrier/object 690 as shown in FIG. 61. Alternatively, the substrate 630 can bare a hologram. The hologram can be partially de-metallized or coated with a high-index optical material to visualize holographic effect on the substrate.

In general, an article may include a main substrate and, optionally, one or more transparent substrates (support sheets) adhered to and supported by the main substrate. The article has an optical component and a graphical component. The optical component may include one or more layers of pigment flakes in a binder, the layers separately provided and aligned on surfaces of the main substrate and/or support sheets. The graphical component, including the central image, may be printed on surfaces of the main substrate and/or support sheets. As described above, the flakes contain a magnetic or magnetizable material, the concentration of the flakes in the binder is less than 14 wt % and preferably 4-8 wt %. The flakes are aligned so as to form one or more frame patterns, such that each frame pattern surrounds the image. Within the frame patterns, angles which flakes form with the substrate decrease to practically zero and then increase along a plurality of radial directions originating at the image so that, when light is incident upon the pigment flakes from a light source, light reflected from the frame patterns forms one or more dynamic frames which at least partially surround the image and appear to move as the article is tilted with respect to the light source, whereas the central image appears to be stationary when the dynamic frames appears to move.

Figure 47:
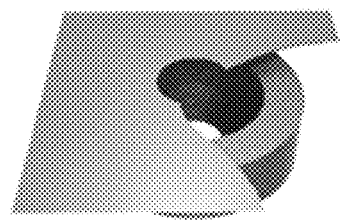
FIGS. 47 and 48 are schematic diagrams of a magnetic assembly.
Figure 48:
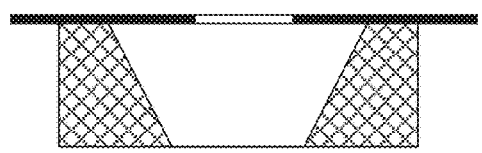

An appealing optical device which has two curved frame regions with convex-oriented arching patterns may be fabricated with a single aligning step, e.g. using the magnet schematically shown in FIGS. 47 and 48. In the first curved region, the arching pattern produces a dynamic frame as in the embodiments discussed above. In the second curved region, the arching pattern produces a stationary frame which appears to not move at different observation angles. Surrounded by the two frames may be a central image. The difference between the two arching patterns is in their width. In order for the "movements" of the dynamic frame to be visible to a naked human eye, the arching pattern of the pigment flakes should have a sufficient size. For example, the width of the first arching pattern in the cross-sections between the two points with the 80 degrees tilt is preferably within the range of from 3 to 20 mm. To the opposite, the width of the second arching pattern resulting in a stationary frame should be sufficiently low; e.g. the width of the second arching pattern in the cross-sections between the two points with the 80 degrees tilt is preferably less than 2 mm. The device may have features of the afore discussed embodiments. By way of example, the graphical component including a security Guilloche pattern may be printed on the substrate with a conventional technique. A layer of a transparent UV-curable ink binder containing 5 wt % of magnetic pigment flakes may be printed over the graphical component. The wet ink may be exposed to the field of the magnet shown in FIG. 47, and the ink is cured after the pigment flakes have been aligned.

With reference to FIG. 47, a cylindrical magnet with a through conical opening in the center of the magnet (FIG. 30) was equipped with a magnetic diverter (shown with a partial cut for illustrative purposes) made from a sheet of metal with high magnetic permeability in the range of thicknesses of from 0.004" to 0.1". The diverter had a hole in the center. The hole can have any desirable shape. FIG. 48 demonstrates a cross-section of the magnet and the diverter.

A schematic profile of the magnetic field generated by the magnetic assembly shown in FIGS. 47-48 is presented in FIG. 49 wherein only a portion of magnetic lines are shown. Magnetic lines 601, shown only above the magnet for illustrative purposes, emerge up from the bottom of the funnel cut in the magnet 602, are disturbed near the diverter 603 bending there around the edges in the region 604. The rest of the field penetrates through the diverter arching above it in the region 605.

Figure 50:
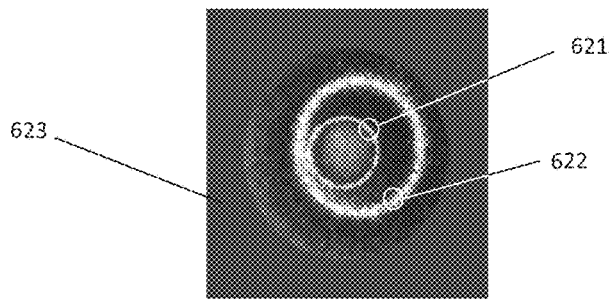
FIG. 50 is a photograph of an article.

FIG. 50 illustrates an article formed using the magnetic assembly shown in FIG. 49. Magnetically alignable pigment flakes which include a magnetic or magnetizable material are provided onto a substrate within a binder in a concentration of less than 14 wt % and preferably between 4 and 8 wt %. When the substrate with wet magnetic ink is placed above the diverter, the pigment flakes in the ink align simultaneously in two arching rings in two curved regions of the substrate. The arching ring pattern formed by aligned flakes around the edge of the diverter has a small radius resulting in the formation of a round contour 621 (FIG. 50). The cross section of the frame (ring) pattern has a arching pattern of the flakes with a small radius of arching, wherein angles which flakes form with the substrate decrease to practically zero and then increase along a plurality of radial directions. The ring-shaped frame 621 appears to be stationary with the tilt of the sample. A larger ring 622 is produced by the second arching pattern of the pigment flakes in the second curved region; the flakes may be thought of as forming a Fresnel parabolic annular reflector. When the sample is tilted, the frame 622 appears to move. At the normal angle of observation, the rings 621 and 622 are concentric. When the sample is tilted to the left, as shown in FIG. 50, the large dynamic ring 622 moves to the right, that is characteristic motion of the convex reflector shown previously in FIGS. 35 and 36, while the small stationary ring 621 keeps its position in the middle of the print. The purpose of the small stationary ring 621 is to serve as a reference frame for the movements of the large dynamic ring 622. In the absence of the small ring, the edge 623 of the printed area may serve as a reference frame for the large dynamic ring 622 providing judgment about its motion. However, the introduction of the small static ring 621 in the middle of the large ring provides an advantage: the small ring 621 in the middle of the large ring 622, like a bull eye in a target, attracts attention first and therefore provides a higher level reference frame for the movements of the dynamic ring 622. The observer starts to judge the large ring travel relatively to the small ring. Additionally, the two rings may create an illusion of s stem rooted in the substrate at the position of the ring 621, and growing off the substrate to the position 622. Although the two rings of a same size may be employed as well, it is preferable to have the stationary ring of a smaller size. Of course, the frames 621 and 622 are not necessarily rings; the shapes of the flames 621 and 622 may vary with using magnets and diverters with variously-shaped cuts, see FIGS. 45 and 46.

Figure 51:
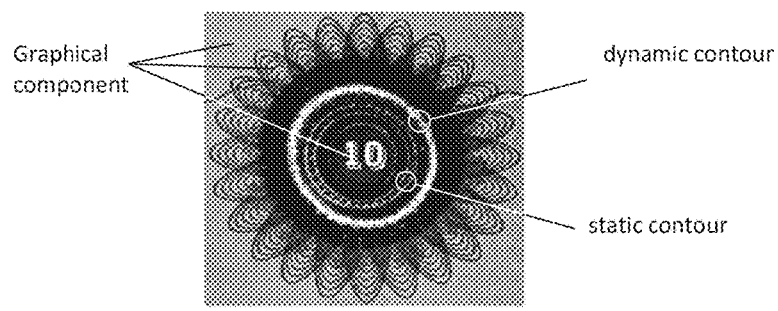
FIGS. 51-58 are photographs of articles.
Figure 52:
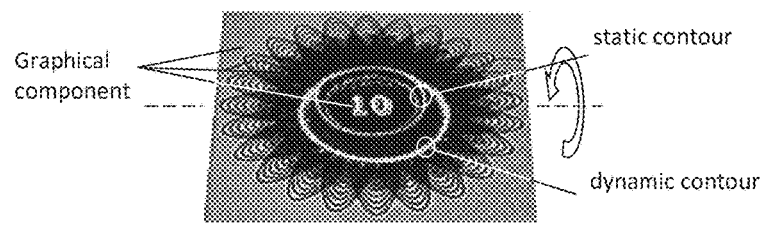

With reference to FIG. 50, the large ring produced by the annular convex reflector may be thought of as a virtual image of the light source illusively located underneath the surface of the article. An observer may have the illusion of the large ring floating underneath the surface of the print and underneath the small ring. The small ring 621 appears to be stationary, because the radius of the corresponding arching pattern is so small that the bright ring formed by reflected light, travels on a dismally short distance which is less than the width of the ring, thus providing only volume to the ring 621 and a "lens effect". When the sample is tilted, the large ring 622 may appear to partially floating underneath the small ring; the occlusion results in the perception of depth as illustrated in FIGS. 51 and 52 which show the optical component illustrated in FIG. 50 printed over the graphical component including the central image "10". FIG. 51 demonstrates the effect at the normal angle to the camera. The numeral "10" is printed inside the dark green circle of the graphical component. The magnet and diverter have been designed and built with dimensions that would match the design of the graphical component. The first contour (the small static ring) has been formed around the dark green circle with the numeral. The second contour has been formed around the first with the dimension providing a 2 to 3 millimeter gap between the rings because, if the gap is too small, the rings will appear as a single ring. A gap which is very wide will not provide the occlusion effect. The gap between the two rings may be up to the diameter of the small ring; preferably not more than 6 mm, and should be at least 2 mm. The gap between the two rings is ensured by the difference in the size of the openings of the magnet and the diverter. Preferably, the diameter of the upper opening in the magnet is at least 5 mm greater than the diameter of the opening in the diverter, and possibly is equal to three diameters of the opening in the diverter. Otherwise, the two rings would appear as a single ring at the normal angle of observation. With a tilt, the single ring would create two rings, a static ring and a dynamic ring.

When the sample is tilted with its upper edge away from the camera, as shown in FIG. 52, the dynamic ring moves toward the camera and floats into the space behind the static ring thus creating incredible perception of depth and flotation.

The small ring gives its own contribution to the effect. Surrounding the dark green circle with the numeral, the small narrow ring creates the "lens effect" as if the green circle within the ring and the numeral are embedded inside and on the bottom of a flat lens floating above the large ring and above the Guilloche pattern.

This effect creates an illusion that the green circle and the numeral are floating in the space above the large ring and the security Guilloche background and below the small ring despite the fact that the green circle and the numeral are printed underneath of both rings.

Figure 53:
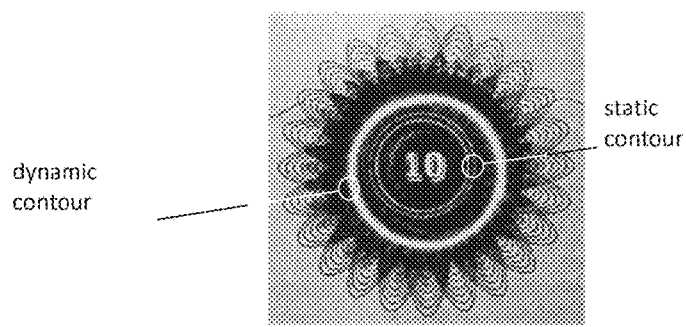
Figure 54:
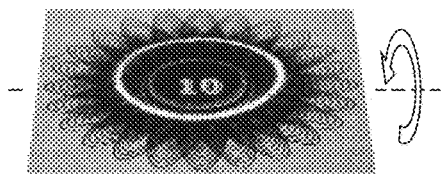

A dual concavo-concave device was fabricated similarly to the device shown in FIG. 38. A clear thin polyester sheet was printed with 5 wt % magnetic ink, aligned as shown in FIG. 49, the ink was cured, the printed polyester flipped up and laminated with adhesive to a corresponding place on the substrate. The device is shown in FIGS. 53 and 54. Both rings are concentric in FIG. 53. At the tilt away from the camera (FIG. 54) the large ring floats away from the camera in the direction of the upper edge of the sample.

Figure 55:
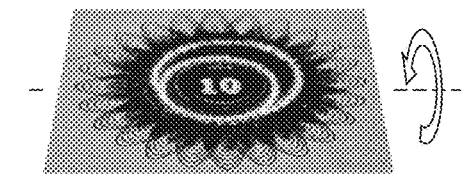
Figure 56:
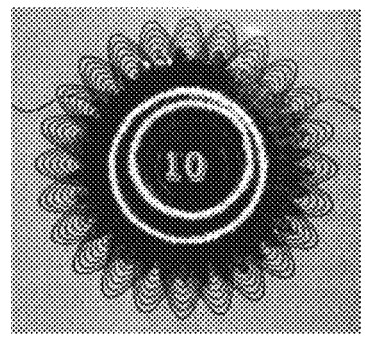

A dual concavo-convex device is a combination of a dual convex device, fabricated on one side of a transparent substrate (FIG. 48-52) and a single convex or a second dual convex device printed on another side of the substrate with their subsequent lamination to the graphical image. The device is shown in FIGS. 55 and 56; it has one small static ring, one larger dynamic and another even larger ring.

When an optical security device manufactured by one of above described methods is illuminated by a white light, the optical component (a ring for example) shows the color of the pigment that was used for its fabrication. However, if the same device exhibiting a colored ring from the direction of the white source is additionally illuminated by a second light from a coherent light source (colored LEDs, for example) from a direction different than the white light source, the device demonstrates a second ring having a color of the coherent light.

Figure 57:
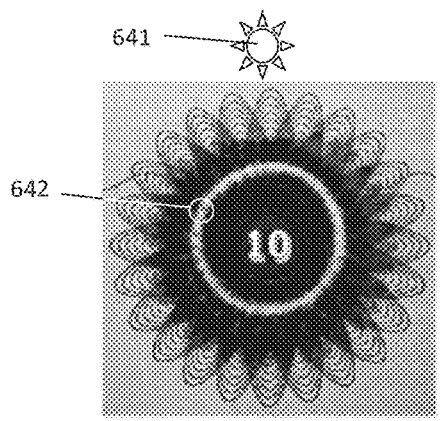
Figure 58:
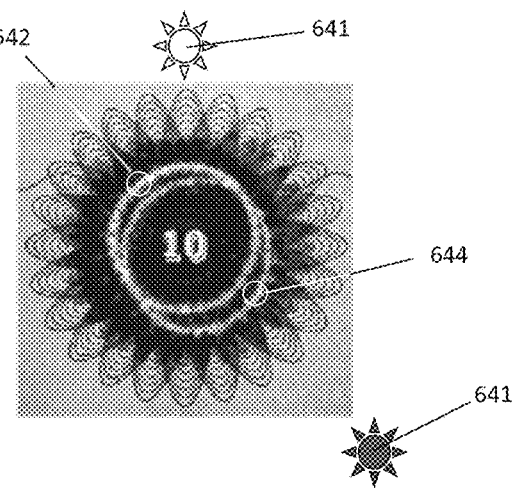

FIG. 57 shows a device fabricated by alignment of Gold/Green magnetic pigment; at the normal angle of observation, the device exhibits a ring of a gold color. The light source 641 generates appearance of the gold ring 642 in the layer of magnetic ink. In FIG. 58 the same device is illuminated at an angle with a red light 643 from the Smith & Wesson Galaxy 28 LED Flashlight (20 White, 4 Red & 4 Blue LEDs). Illumination of the print with the red light produces appearance of the red ring 644 in addition to the gold ring 642 that doesn't change its color at illumination of the device with a light of different color. As clearly seen, the red ring appeared in the scene in addition to the gold ring.

Figure 59:
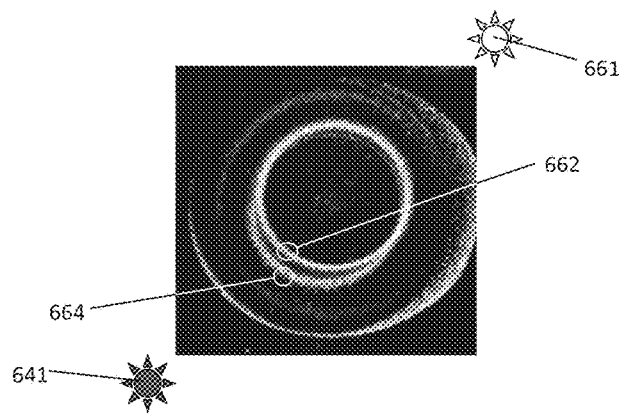
FIG. 59 is a photograph of an article.

The device illustrated in FIG. 59 demonstrates the same effect. The device was fabricated by printing of a layer of ink containing particles of green magnetic pigment on a black card. The device was illuminated from different directions with the white light source 661 and with the red source 663. Respectively, the green ring 662 was generated in the direction of the white light and the red ring 664 was generated in the direction of the red light. The rings had a separation distance of 0.125". The tendency in FIG. 59 is the same as in FIG. 58: the red ring appears in addition to the green. The appearance in the lighting scene of a ring with the color corresponding to the light from a coherent light source in addition to the ring of the color of the pigment can be used for express authentication of optical security devices.

A morphing effect is a smooth change from one image to another. A variety of morphing effects can be produced with magnetic pigment flakes aligned in a magnetic field. It has been discovered that magnets having a countersink through cut (FIGS. 63 and 64) align pigment flakes so as to produce a dynamic frame which changes its size when the frame appears to move; the shape of the frame essentially does not change. As above, manufacturing of an article includes providing pigment flakes having a magnetic or magnetizable material in a preferably transparent binder, in a concentration of less than 14 wt %, preferably between 4 and 8 wt %.

Figure 63:
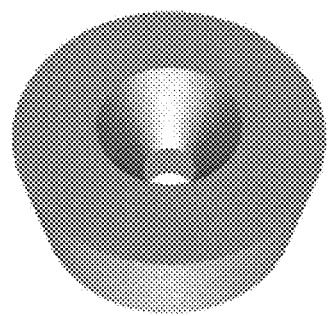
FIGS. 63 and 64 illustrate a magnet.
Figure 64:
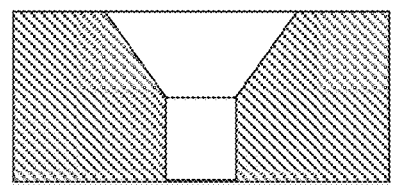
Figure 66:
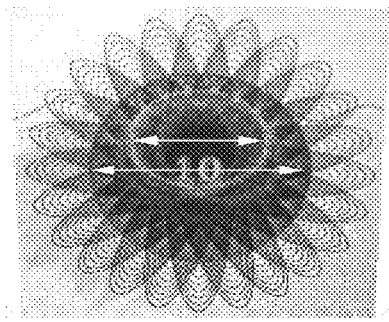

Differently from the magnet shown in FIG. 63, the magnet, shown in the FIGS. 29 and 30 produces a ring that does not change its size with the tilt of the article as demonstrated in the FIGS. 35 and 36. In this case, the funnel in the magnet ends at the very bottom of the magnet, as it can be seen in FIG. 29. The magnet illustrated in FIGS. 63 and 64 has a countersink cut which is a through cut wherein a cylindrical opening connects to the smaller opening of a funnel. The magnet shown in FIGS. 63 and 64 is different from the magnet shown in FIG. 30 in that the radius of the cut doesn't change in the lower part of the magnet shown in FIG. 64. The difference results in the morphing optical effect: pigment flakes aligned with a magnet having a through countersink cut, when irradiated with light from a light source, reflect light so as to form a dynamic frame which changes its size when the frame appears to move. The shape of the frame essentially does not change. Although FIG. 66 shows the dynamic frame as an oval, an observer perceives the frame as a tilted circle. While FIGS. 63 and 64 show a one-piece magnet, it can be replaced by a stack of magnets e.g. including the magnet shown in FIG. 29 complemented with a cylindrical magnet. The openings in the magnet shown in FIGS. 63 and 64 are not necessarily round and can be of a variety of shapes. The angle of the cut may vary in the range of from 30° to 120°. The wide opening of the cut is preferably facing the substrate, i.e. the preferable range of for the angle of the cut is between 30° to 90° and more preferable between 30 and 60°.

Figure 65:
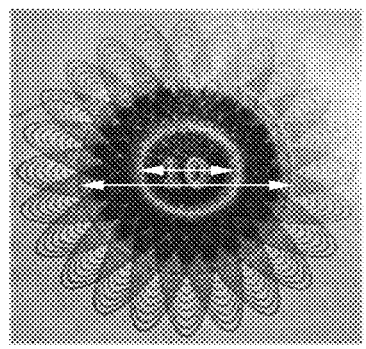
FIGS. 65 and 66 are photographs of an article.

The morphing effect produced by this magnet is illustrated in FIGS. 65 and 66. At the normal angle of observation (FIG. 65), the article exhibits a bright ring around the numeral "10". FIG. 66 shows the article when the sample is tilted. The ring has moved and its size have changed; the ring diameter now is about 30% b larger than the diameter of the ring in FIG. 65; thus the article demonstrates the morphing effect: there is no change in the shape of the dynamic ring whereas the size of the frame (ring) changes as the ring appears to move. All other features of the article are the same as in the article described with reference to FIGS. 4-9. In particular, the opening in the upper surface of the magnet or stack of magnets is not necessarily round, but can be in a variety of shapes so as to produce variously-shaped dynamic frames which change their size as they appear to move. Furthermore, a diverter may be placed over the magnet or stack of magnets with a countersink through cut. The presence of the diverter results in an additional, stationary frame produced by light reflected from aligned pigment flakes.

A variety of articles exhibiting the morphing effect are described further with reference to FIGS. 65-88.

Figure 67:
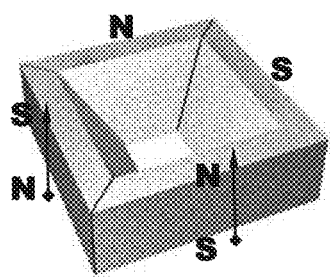
FIG. 67 is a schematic diagram of a magnetic assembly.
Figure 68:
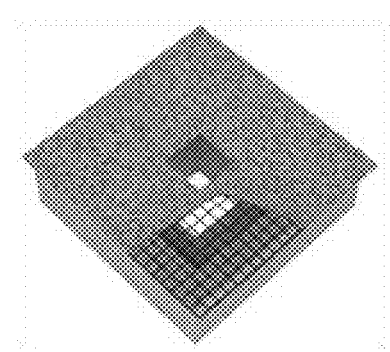
FIG. 68 is a schematic diagram of a magnetic assembly.

With reference to FIG. 68, a magnetic assembly includes a diverter which may be a sheet of high or medium magnetic permeability placed on magnets. The purpose of a diverter is to deflect the field in a predetermined direction from its original direction. The diverter shown in FIG. 68 is a thin sheet of a metal with high magnetic permeability (supermalloy, mu-metal, permalloy, etc.). The thickness of the diverter may vary in a wide range and is defined by configuration of the field and the grade of the magnet. The diverter with a square cut in the center, shown in FIG. 68, was made from a 0.006" thick sheet of mu-metal. The diverter was placed directly on the assembly of four magnets that has a pyramidal extruded cut through the center of the assembly as shown in FIG. 67. The paper substrate, previously coated with wet ink containing dispersed magnetic flakes, was placed on the top of the diverter.

Figure 69:
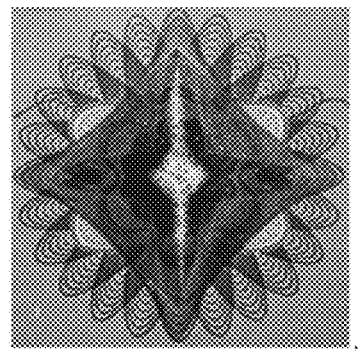
FIG. 69-71 are photographs of a printed article.
Figure 70:
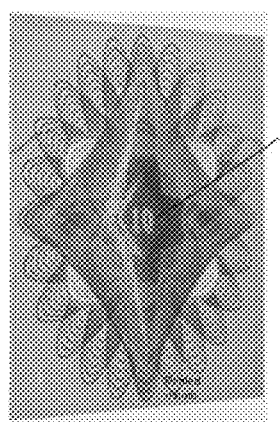
Figure 71:
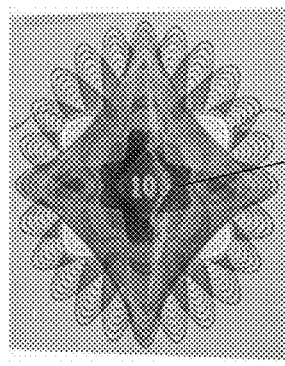

The ink was cured with UV light completion of the alignment of the flakes. As a result, aligned magnetic flakes have formed a convex reflective surface. The diverter deflected the field around the edges of the square cut, differently aligning the flakes in the margins of the cut. With reference to FIG. 69, a printed graphical component includes a Guilloche rosette, a dark colored rhomb, and a numeral in the center of the rosette. The rhomb has the same size as the cut in the diverter. The graphical component was overprinted with magnetic ink, and the magnetically alignable flakes within the ink were aligned using the magnetic assembly shown in FIG. 68. Magnetic flakes, deflected around the edges of the diverter, created an outline for the graphical image. The graphical components of the article in the FIG. 69 includes several guilloche patterns and a dark rhomb printed in the center of the graphical component and containing contrasting white numeral "10" in its center. FIG. 69 demonstrates the article printed with both graphical and optical components at the normal angle of observation. The effect appears as a shiny rhomb with two points emerging from it in opposite directions. The magnetically aligned rhomb appears to be opaque and obscures the graphical rhomb printed underneath the magnetically aligned optical component. The magnetically aligned effect changes when the sample is tilted with its right edge away from the observer (FIG. 70). Now, the opaque rhomb becomes transparent with a bright arrowhead outlining the printed graphical rhomb. The graphical printed rhomb with the numeral "10" is highly visible. When the sample is tilted with its left edge away from the observer, the effect moves in the opposite direction (FIG. 71). FIGS. 69 through 71 present the boomerang (or "swing") effect which has a spindle-like appearance widest in the middle and tapering at the top and at the bottom. The bright image gradually changes its shape and flips from the left side of a central vertical (with respect to the drawing) axis of the printed image to the right side of the axis. The effect is enabled by a curved alignment of the flakes, wherein flakes along the central vertical axis lie parallel to the substrate and, in cross-sections normal to the vertical axis, the flakes form arching patterns with radii of the arch increasing and then decreasing along the axis. The arrowhead feature shown in FIGS. 69-71 adjacent to two sides of the rhomb touching the boomerang when the sample is tilted. The portion of the flakes located close to the edges of the cut through magnetic deflector are locally distorted which results in the appearance of the arrowhead-like outline of the rhomb element of the graphical component.

The incorporation of sheet metal between the top of the magnet and the bottom of printed substrate with the layer of wet ink containing magnetic flakes allows tuning of the field direction and its magnetic flux magnitude. Magnetic fields can be re-routed around objects. By surrounding an object with a material which can "conduct" magnetic flux better than the materials around it, the magnetic field will tend to flow along this material and avoid the objects inside.

When ferromagnetic sheet or plate is placed into a magnetic field, it draws the field into itself providing a path for the magnetic field lines through it. The field on the other side of the plate is almost nil because the plate has diverted the field causing a lot of it to flow within the plate itself instead of in the air.

Magnetic properties of metals define how these metals divert magnetic field when they in the sheet form are placed in the field. Metals or alloys with high magnetic permeability are usually used got this purpose. Mu-metal or permalloy are broadly used for shielding purposes; they typically have relative permeability values of 80,000-100,000 compared to several thousand for ordinary steel.

Mu-metal and permalloy also have very low saturation, the state where an increase in magnetizing force produces no further increase in magnetic induction in a magnetic material. So while it is extremely good as a conduit for very weak fields, it is essentially not much better than air when it comes to very strong magnetic fields. The field is diverted toward the magnetic pole located in the center of their print with magnetic ink reducing radius of magnetically aligned ring that looked as if the field was focused. However, the reality is that such shielding of the field almost twice reduces its flux magnitude.

FIGS. 72 and 73 are simulations which illustrate changes in a magnetic field when a sheet of a different materials is placed above a magnet. A mumetal sheet was placed on the magnet in FIG. 72 and a cold rolled sheet of 1018 steel was placed on the top of the same magnet.

As demonstrated in the pictures, the Mumetal sheet dissipates the field along its volume. The steel sheet, having a lower permeability, attracts a lot of field near the magnet.

The distance between the magnet and the sheet has also effect the field propagation through the metal and the field magnitude above the shield. A good demonstration of it can be seen in cartoons at http://www.coolmagnetman.com/motion10.htm.

The purpose of the diverters was in the deflection of the field in a predetermined direction from its original to change alignment of particles in predictable way.

The diverters may be Mumetal sheets and cold rolled steel sheets (cold rolling makes sheets with a larger grain size that improves magnetic permeability). The thickness of the sheets may vary in the range of from 0.004" to 0.1".

In experiments, the Mumetal sheets have been selected with the thickness that allowed the field to penetrated the sheet. The diverters had a cut in the middle thereof. The cuts had different shapes for different magnets. The field curved around the edges of the cut correspondingly aligning magnetic pigment in addition to the flakes aligned in the field penetrated through the magnets as illustrated in FIG. 68. Optical effects, produced by introduction of a diverter are illustrated in FIGS. 69-71. A magnet with a diverter is shown in FIG. 74 and the optical effect generated by this assembly is illustrated in FIG. 75.

For more unusual optical effects, the diverters were cut in different pieces and put on the magnet to drive the field around the edges allowing it also penetrate through the plane of the diverter. Examples of such effects with corresponding magnets are demonstrated in FIGS. 76-84.

The optical effect in FIG. 77 has been photographed at the normal angle, while in FIG. 78—at the tilt away from the camera.

Magnetic assembly schematically illustrated in FIG. 79 produces effects shown in photographs at normal angle (FIG. 80) and at the tilt of the sample (FIG. 81).

The magnetic assembly in FIG. 82 produces effects demonstrated in photographs at normal angle (FIG. 83) and at the tilt of the sample (FIG. 84).

The second method included steel diverters completely blocking magnetic field. These diverters, also cut in pieced and put in particular places on the top of the magnet, blocked the field in these places and allowed the field to emerge from non-blocked places.

The same assembly as shown in FIG. 76 but with a different diverter produces a "bow tie" effect demonstrated in FIG. 85 at the normal angle, in FIG. 86 at a tilt to the left, in FIG. 87 at a tilt away from the camera, and in FIG. 88 at a tilt toward the camera. FIGS. 85-88 exhibit the morphing effect that changes (or morphs) one image into another through a seamless transition, for example as shown in FIG. 86: the upper part of the "bow" expands while the bottom part shrinks with the tilt of the sample away from the camera.

The thickness and material selection for a diverter depend on the strength of the magnet and its configuration. For example, neodymium boron iron sintered magnets are very strong. Placing a thick steel plate on the top of the magnet in FIG. 76 doesn't prevent the field from coming through the diverter in order to align the flakes and form the pattern demonstrated in FIGS. 77 and 78. Replacement of the sintered magnet with a compression bonded neodymium boron iron magnet entirely converts the field through the volume of the diverter elimination its appearance on the surface of the diverter as shown in FIGS. 76 and 85-88. The field comes up through the openings between diverters and curves around the edges of the diverters creating a volume effect.

In the embodiments described above with reference to FIGS. 65-88, the articles exhibiting the morphing effect are manufactured by proving a coating having pigment flakes dispersed in a binder to a substrate, wherein the pigment flakes include a magnetic or magnetizable material, aligning the pigment flakes with a magnetic assembly comprising a magnet and a diverter, and fixing the binder. The substrate may or may not support a graphical component, and the morphing effect per se may be used as a security or highly decorative feature. The concentration of the magnetic pigments in the ink may vary in the range of 4-25 wt %; however, when an underlying graphical component should be visible, the concentration of the pigment flakes in the ink should be less than 14 wt %. The magnet, such as shown in FIGS. 67, 76, 79, and 82 has top and bottom surfaces, and a through cut between the top and bottom surfaces whereby the top surface has a top opening and the bottom surface has a bottom opening. The magnetic axis of the magnetic assembly is in a direction from the top surface to bottom surface, or in the opposite direction. The diverter is adjacent to the top surface of the magnet, wherein the top opening is only partially covered by the diverter as shown in FIGS. 68, 74, 76, 79, and 82. The diverter may be a metal sheet, preferably of high magnetic permeability. The thickness of the sheets may vary in the range of from 0.004" to 0.1".

The following comments and particular details relate to all the embodiments described herein.

The described articles may have a graphical component and an optical component, both supported by a substrate, with the optical component possibly on the top of the graphical component. The graphical component includes one or more layers of ink, possibly printed onto the substrate or onto one or more plastic support sheets attached to the substrate. The optical component includes one or more layers possibly printed onto the substrate or onto one or more plastic support sheets attached to the substrate; the layer(s) of the optical component contain pigment flakes having a permanent magnetic or magnetizable material and are dispersed in a binder; some of the pigment flakes within the optical component are aligned so as to produce at least a dynamic frame around a symbol which is part of the graphical component. The article may be integrated into a banknote or a security label. The graphical component can include one of security patterns used in the document security industry and/or a picture or a symbol. The optical component can be made with color-shifting interference pigments or reflective metallic pigment flakes. The optical component enhances appearance of the graphical component. The optical component reflects light from a concave, convex, convexo-convex, or convexo-concave, etc. arrangement of magnetic pigment flakes (platelets) dispersed in a binder and aligned along the lines of applied magnetic field. The binder may be a light transmissive, preferably clear, UV-curable binder. Concentration of the particles in the binder is preferably in the range of 4 wt %-14 wt %, and more preferably between 4 and 8 wt %. Weight percentage is defined as that portion of the cured, dried ink that results from the weight of the pigment flakes. For inks such as ultraviolet-cured high solids silkscreen inks, there are essentially no solvents. So a first example UV-cure ink with 8 wt. percent pigment flakes would have 92% UV resin and curing agents/additives. But if a solvent-borne ink such as solvent-Intaglio or solvent-gravure is utilized, a calculation is required to take into account the effect of that fraction of volatile solvent. As an alternate example, an uncured wet solvent-borne gravure ink starting with 50 wt % solvent, 45 wt % resin, and 5 wt % pigment flakes would dry to become a dried cured ink layer having 10 wt % pigment flakes and 90 wt % resin. Thus this second example ink would represent the case of 10 wt % pigment flakes because the definition of weight percentage refers to dried cured ink.

Both components may be printed using conventional techniques. Graphics and the optical effect produced by the optical component should complement each other. The optical component may be provided either over or below the graphics. The optical component can be coated in patterns or can be coated as a continuous layer. The optical component can be in the form of a convex reflector (when the substrate printed with wet magnetic ink is placed on the top of the magnet) or concave reflector (when a thin transparent polymer sheet printed with wet magnetic ink is placed on the top of the magnet, flakes aligned in the field, ink cured and transparent sheet laminated with printed side to the graphical image) or a combination of concave and convex reflectors. The optical component may be printed with pigments of the same color or having the same color shift as the pigments in graphical component. Preferably, the optical effect generated by the optical component obscures only a small portion of entire region leaving the rest of the printed image available for observation.

In the embodiments where a magnetic ink is printed onto a plastic support substrate (e.g. transparent polyester), the substrate may have a transparent hologram, bearing a symbol or a pattern, which may graphically match the pattern of the substrate. The hologram is preferably coated with a layer of a material with high index of refraction in the range of between 1.65 and 4.0. The hologram provides an additional security feature to the device, because manufacturing of the device involves not only skills in security printing and magnetic alignment, but also skills in making of holograms.

The graphical component may be formed of a non-magnetic ink that the pigments therein are not alignable in the presence of the magnetic field used for the alignment of the optical component. The central image surrounded by the frame may be a symbol or logo; it may be printed in one or more colors. i.e. by applying one or more inks Preferably, the central image is printed with non-magnetic ink(s). However, a magnetic ink with a concentration of between 20 and 30 wt % may be used; the pigments of that ink preferably are planarized so as to lie parallel to the surface of the substrate and thus form a static image.

The substrate may be a paper, plastic, or cardboard substrate, etc., and the resulting article may be a banknote, a credit card, or any other object thereto magnetically alignable flakes are applied as described herein.

Magnetically alignable pigment flakes may be formed of one or more thin film layers, including a layer of permanently magnetic or magnetizable material such as Nickel, Cobalt, and their alloys. In this application, the term "magnetic" is used to include permanently magnetic as well as magnetizable materials, pigment flakes, inks, etc. In the pigment flakes, the magnetic layer may be hidden between two reflector layers, preferably made of Aluminum. Additionally, a dielectric layer may be provided on each reflector layer, and an absorber layer—on each dielectric layer, thus forming color-shifting flakes. Various thin-film flakes and methods of their manufacturing are disclosed e.g. in U.S. Pat. Nos. 5,571,624, 4,838,648, 7,258,915, 6,838,166, 6,586,098, 6,815,065, 6,376,018, 7,550,197, 4,705,356 incorporated herein by reference. The pigment flakes are essentially planar, however may include symbols or gratings. The flakes have a thickness of between 50 nm and 2,000 nm, and a length of between 2 microns and 200 microns. Preferably, the length of the flakes is in the range of 5-500 microns, and the thickness in the range of 50 nm to 5 microns. The flakes may have an irregular shape. Alternatively, shaped flakes such as square, hexagonal, or other selectively-shaped flakes may be used to promote coverage and enhanced optical performance. Preferably, the pigment flakes are highly reflective flakes having at least 50%, and preferably 70%, reflectivity in the visible spectrum.

The pigment flakes are conventionally manufactured using a layered thin film structure formed on a flexible web, also referred to as a deposition substrate. The various layers are deposited on the web by methods well known in the art of forming thin coating structures, such as Physical and Chemical vapor deposition and the like. The thin film structure is then removed from the web material and broken into thin film flakes, which can be added to a polymeric medium such as various pigment vehicles (binders) for use as ink, paint, or lacquer which are collectively referred herein as "ink," and may be provided to a surface of a substrate by any conventional process referred herein as "printing." Furthermore, the term "ink" is used for a liquid or paste ink used for printing, as well as to indicate a dry coating resulting from the printing process. The binder is preferably a clear binder, but may be tinted with a low amount of conventional dye, and may include a low amount of admixtures, e.g. taggant non-magnetic flakes having a symbol thereon.

Within the ink, the magnetically alignable flakes may be oriented with application of a magnetic field produced by one or more permanent magnets or electromagnets. Generally, the flakes tend to align along the magnetic lines of the applied field while the ink is still wet. Preferably, the ink is solidified when the printed image is still in the magnetic field. Various methods of aligning magnetically alignable flakes are disclosed e.g. in U.S. Pat. No. 7,047,883 and U.S. Patent Application No. 20060198998, both incorporated herein by reference. Advantageously, the magnetic alignment of the flakes may be performed as part of a high-speed printing process, wherein a printed image moves on a support, e.g. a belt or plate, in proximity of a permanent magnet at a speed of from 20 ft/min to 300 ft/min. The magnet may be placed under or above the belt or plate, or embedded into a roller used in a rotational printing apparatus.

The pigment flakes, after being magnetically aligned, form a frame pattern possibly surrounding the image provided by the graphical component. A cross-section of the frame pattern includes pigment flakes aligned parallel to the substrate in the central part of the cross section, as well as pigment flakes tilted with respect to the substrate. Angles which pigment flakes form with the substrate, i.e. the angle between the planes of the flakes and the substrate, decrease to practically zero and then increase along a plurality of radial directions originating at the center of the frame or the central image, if present. Preferably, the cross section of the frame pattern includes pigment flakes oriented near normally on both sides of the central portion of the cross section where pigment flakes are parallel to the substrate. On both sides of the central portion of the cross section, the flakes form at least at 70 degrees, and preferably at least 80 degrees with the substrate, so as to reduce the shadow or "path" the dynamic frame might leave as it appears to move, see FIGS. 1 and 2.

The articles described in this application may be used as security devices and/or for decorative purposes. The devices disclosed herein are identifiable and easily recognizable, and thus may be used for providing security features. They are eye catching, visually attractive, and affordable because they are printable. Magnetically aligned pigment flakes create the perception of floating and motion of a magnetically aligned bright frame and/or of a graphical image within the bright frame. Of course, the perception of illusive effects depends on a human brain, and a particular effect may appear differently to different people.

The composite images produced by the aforedescribed optical devices may have one or two enclosing optical elements of in a variety of shapes (rings, diamonds, pentagons, etc.) surrounding a mono- or multicolored graphical image, e.g. defined by the brand owner or security printing specialist. The enclosing optical elements (frames) reflect incident light and produce the perception of depth and illusive motion of the multicolored graphical image. Illusive flotation takes place either underneath or above the surface of the security device. It may virtually appear to be underneath of the graphical image. The device may have a communicative effect if it bears a multi-colored graphical message (logo of a brand owner, product symbol, etc.) inside of a neutral silver floating optical enclosure. The graphical image is a part of the composite imaging system and may be perceived as moving because a reference object around it (a magnetically aligned feature) moves in respond to external stimulus.

Advantageously, in a printed article with a dynamic stereoscopic effect related to an optical parallax of the bright frame, an observer may see the bright frame as floating in a distance of 3-8 mm from the substrate. Optical devices disclosed in this application may cause illusory flotation of graphical elements of the device, as well as motion and morphing of optical elements. The graphics printed on a banknote plays an important role in the note's appearance and its acceptance by the public. The dynamic optical component enhances the appearance of the graphical component by managing the visual perception: stereopsis, reference frames and occlusion. It is desirable to avoid interruption of the graphical image on the surface of the note with magnetic ink, but to use the magnetic ink to enhance the image with depth, motion and flotation so that the optical effect produced by the flakes serves as a reference frame for the graphics, which problem is solved by using the low concentrations of the magnetic ink, the frame pattern which concentrates attention of an observer in the center of the frame, and an arching alignment of the pigment flakes in the cross sections of the frame pattern which concentrate reflected light into a bright dynamic frame, whereas the dynamic quality of the frame increases the attention of the observer.

We claim:

1. An article comprising:
a substrate;
a graphical component comprising a first ink and forming a background including one or more colors, and an image discernible from the background, supported by the substrate; and
an optical component comprising a second ink, wherein the second ink is different from the first ink and comprises a plurality of pigment flakes, supported by the substrate, wherein the graphical component is at least partially disposed above the substrate and beneath the optical component;
wherein the pigment flakes include a magnetic or magnetizable material and are aligned so as to reflect incident light in a frame pattern such that the frame pattern surrounds the image;
wherein, within the frame pattern, along a plurality of radial directions originating within the image, angles which the pigment flakes form with the substrate decrease until at least a pigment flake of the plurality of pigment flakes is parallel to the substrate and then the angles increase so that, when light is incident upon the pigment flakes from a light source, light reflected from the frame pattern forms a dynamic frame which surrounds the image and the dynamic frame appears to move as the substrate is tilted with respect to the light source;
wherein the image appears to be stationary when the dynamic frame appears to move; and
wherein a size and a concentration of the pigment flakes in the second ink are such that a portion of the background adjacent to the dynamic frame is at least partially visible through the optical component.

2. The article as defined in claim 1, wherein along one of the plurality of radial directions the angles which pigment flakes form with the substrate decrease from at least 70 degrees to zero and then increase to at least 70 degrees.

3. The article as defined in claim 1, wherein the image comprises a symbol or logo.

4. The article as defined in claim 1, wherein the concentration of pigment flakes in the first ink is greater than 20 wt. %.

5. The article as defined in claim 1, wherein the concentration of the pigment flakes in the second ink is greater than 4 wt % and less than 14 wt %.

6. The article as defined in claim 1, wherein an additional frame is visible when the article is irradiated with light, and the dynamic frame appears to move relative to the additional frame.

7. The article as defined in claim 1, wherein the optical component covers the image, and wherein the pigment flakes in the second ink are aligned so that the image is visible.

8. The article as defined in claim 1, wherein the optical component is on a transparent support attached to the substrate.

9. The article as defined in claim 1, wherein along one of the plurality of radial directions, angles that the pigment flakes form with the substrate decrease from at least 80 degrees at an originating point of the plurality of radial directions to zero and then increase to at least 80 degrees near the edge of the frame.

10. The article as defined in claim 1, wherein the first ink and the second ink provide a color shifting effect.

11. The article as defined in claim 1, wherein the dynamic frame appears to float out of a plane of the substrate.

12. The article as defined in claim 1, wherein the article is a security device.

13. The article as defined in claim 1, wherein the article is a banknote.

14. An article comprising:
a substrate and a multilayered image supported by the substrate, wherein the multilayered image comprises an indicia, a background pattern, and a coating comprising ink comprising pigment flakes, wherein the pigment flakes comprise a magnetic or magnetizable material,
wherein the coating is supported by a frame region of the substrate surrounding the indicia and covering a portion of the background pattern;
wherein a cross-section of the coating in the frame region has an arching pattern of pigment flakes, and the arching pattern is maintained along the frame region so that light reflected from the arching pattern forms a dynamic frame which surrounds the indicia and moves relative to the background when the substrate is tilted; and
wherein a size and a concentration of the pigment flakes in the ink is such that a portion of the background underlying the frame region outside of the dynamic frame is at least partially visible whereby the dynamic frame delimits an indicia-containing dynamic region from the background and the dynamic region moves relative to the background when the substrate is tilted so that the dynamic frame or indicia appears to float out of a plane of the substrate.

15. An article comprising:
a substrate and an optical component comprising pigment flakes in a binder supported by the substrate, wherein the optical component has a first curved region comprising a first plurality of pigment flakes aligned in a first arching pattern in cross sections of the first curved region so that light reflected from the first plurality of pigment flakes provides an image of a first frame, and the optical component has a second curved region comprising a second plurality of pigment flakes different from the first plurality of pigment flakes, aligned in a second arching pattern in cross sections of the second curved region so that light reflected from the second plurality of pigment flakes provides an image of a second frame, wherein the first frame appears to move relative to the second frame when the substrate is tilted.

16. The article as defined in claim 15, wherein flakes in the second curved region are aligned in an arching pattern so that the second frame appears to move when the substrate is tilted, and wherein the first and second arching patterns arch in opposite directions so that the first and second frames appear to move with respect to the substrate and to each other.

17. The article as defined in claim 15, wherein the first plurality of pigment flakes in the first frame are lying with respect to the substrate so that the first frame appears static when the substrate is tilted.

18. The article as defined in claim 15, wherein the first curved region coincides with the second curved region.

19. The article as defined in claim 15, wherein the optical component comprises a first layer comprising the first plurality of pigment flakes, and a second layer comprising the second plurality of pigment flakes.

20. The article as defined in claim 19, further comprising a transparent plastic support attached to the substrate, wherein the first or second layer is coated onto the transparent plastic support.

21. The article as defined in claim 15, further comprising an image printed in non-magnetic ink.

22. An article comprising:
   a substrate and an optical component comprising a plurality of pigments, supported by the substrate;
   wherein the pigments are pigment flakes that include a magnetic or magnetizable material, aligned so as to reflect incident light in a frame pattern such that the frame pattern surrounds an image and, within the frame pattern, along a plurality of radial directions originating within the image at a point of origination, angles which the pigment flakes form with the substrate decrease from at least 70° at the point of origination until at least one pigment flake of the plurality of pigment is parallel to the substrate and then the angles increase again to at least 70° near the edge of the frame so that, when light is incident upon the pigment flakes from a light source, light reflected from the frame pattern forms a dynamic frame which appears to move as the substrate is tilted with respect to the light source, and wherein a size of the dynamic frame changes as the frame appears to move.

23. The article defined in claim 22, wherein a shape of the dynamic frame is maintained when the dynamic frame appears to move.

24. A method of manufacturing the article defined in claim 22, comprising:
   providing a coating having pigment flakes dispersed in a binder to a substrate, wherein the pigment flakes include a magnetic or magnetizable material, aligning the pigment flakes with a magnetic assembly, and
   fixing the binder,
   wherein the magnetic assembly comprises a stack of one or more magnets, the stack has top and bottom surfaces, and a through cut between the top and bottom surfaces whereby the top surface has a top opening and the bottom surface has a bottom opening smaller than the top opening, and
   wherein a magnetic axis of the magnetic assembly is in a direction from one to another of the top and bottom surfaces.

25. The method as defined in claim 24, wherein the through cut is a tapered extruded cut.

26. The method as defined in claim 24, wherein the top opening has a same shape as the bottom opening.

27. The article as defined in claim 22, wherein the concentration of the pigment flakes is greater than 4 wt % and less than 14 wt %.

* * * * *